June 1, 1948.　　　　R. E. MUMMA　　　　2,442,428
CALCULATING DEVICE
Filed Dec. 27, 1943　　　　　　　　　　22 Sheets-Sheet 1

June 1, 1948.  R. E. MUMMA  2,442,428
CALCULATING DEVICE
Filed Dec. 27, 1943  22 Sheets-Sheet 2

FIG. 2

INVENTOR
ROBERT E. MUMMA
BY Earl Beust
HIS ATTORNEY

June 1, 1948. R. E. MUMMA 2,442,428
CALCULATING DEVICE
Filed Dec. 27, 1943 22 Sheets-Sheet 18

INVENTOR
ROBERT E. MUMMA
BY Karl Benst
HIS ATTORNEY

RELAYS
IMPULSE GENERATOR TO
TALLY UNIT

INVENTOR
ROBERT E. MUMMA

June 1, 1948.  R. E. MUMMA  2,442,428
CALCULATING DEVICE
Filed Dec. 27, 1943  22 Sheets-Sheet 22

Patented June 1, 1948

2,442,428

UNITED STATES PATENT OFFICE 2,442,428

CALCULATING DEVICE

Robert E. Mumma, Dayton, Ohio, assignor to The National Cash Register Company, Dayton, Ohio, a corporation of Maryland Application December 27, 1943, Serial No. 515,718

19 Claims. (Cl. 235—61)

This invention relates to an electronic calculating device for handling discrete numbers, the digit-representing elements of which device are electron tubes.

The disclosed device consists of an accumulator, an impulse generator, a tally unit, and a denominational distributor for relaying the generated impulses to the accumulator. The impulse generator produces in a cycle of operation a selected number of unit-representing electric impulses in each of selected denominations. The tally unit includes means to recycle the impulse generator a selected number of times in each of selected calculating stages and to control the denominational distributor to route the generated impulses to the proper denominations of the accumulator according to the stage of the calculating operation. The accumulator is actuable by the generated impulses in a forward or reverse manner as selected, so as to handle entries additively or subtractively. Adding and subtracting entries require but one cycle of operation of the impulse generator and the routing of the generated denominational impulses into equivalent denominations of the accumulator. Calculations requiring repeated entries of denominational impulses into equivalent or higher denominations of the accumulator are performed by recycling the impulse generator and causing the stage control portion of the tally unit to control the denominational distributor to function by stages.

The extremely high-speed reaction of electron tubes to impulses permits calculations requiring multiple entries of data into the accumulator to be made in a small fraction of the time consumed by mechanical or electro-mechanical devices doing the same work. The calculating device disclosed herein operates on what is known in the art as the principle of successive addition (or subtraction).

The accumulator, basically, is an improvement of the type shown in my co-pending application for United States Letters Patent, Serial No. 396,505, which was filed June 4, 1941, and issued on July 30, 1946, as Patent No. 2,405,096. This accumulator consists of a plurality of denominational groups of digit-representing electron tubes, those tubes of a group being coupled in an endless counting chain for operation one at a time, in succession, by each of commonly received electric impulses. The improvement made in the accumulator by this invention provides means for entering data additively or subtractively therein, and to do such without affecting the accumulation of data up to the time of change from adding to subtracting or vice versa. The direction of serial operation of the tubes in a denominational unit of the accumulator, formerly fixed, is now by this invention controlled by means interconnecting the tubes, so that the chain may be operated as selected in a forward or reverse manner for a given entry, the direction of operation determining whether the data is entered additively or subtractively. Denominational transfers of carry-over data are made at the proper time in the operation of the counting ring be the same in an adding or subtracting operation.

Therefore, the principal object of the invention is to provide a novel electronic calculating device for handling discrete numbers.

Another object of the invention is to provide electronic counting rings with circuits permitting forward or reverse operation as selected.

Another object of the invention is to provide an electronic device for relaying and routing electric impulse data so as to enter it by calculating stages into various denominational orders of an accumulator.

Another object of the invention is to provide means to enter automaticaly a multiplicand repeatedly into a product accumulator of the electronic type, denomination by denomination, in succession, by stages of calculation.

Another object of the invention is to provide an electric impulse generator which, in a cycle, issues denominationally distinguished unit-representing electric impulses, corresponding to a multiplicand, said cycle being repeated as many times as represents the sum of the digits of a selected multiplier.

Another object of the invention is to provide counting rings of electron tubes having denominational carry-over transfer means between the rings, the ring to which the carry-over is made being operated one step in either a forward manner or a reverse manner as selected.

Another object of the invention is to provide means for automatically issuing electric impulses by denominations, said impulses corresponding in number to the digits of each corresponding denomination of a selected-multi-digit decimal number, and to repeat the act, a number of times, corresponding to the sum of the digits of another decimal multi-digit number.

With these and incidental objects in view, the invention includes certain novel features of construction, circuits, and combinations of parts, the essential elements of which are set forth in appended claims and a preferred form or embodiment of which is hereinafter described with reference to the drawings which accompany and form a part of this specification.

Of the drawings:

Figs. 1, 2, 3, 4, 5, 6, 7, and 8 show, respectively, the units, tens, hundreds, thousands, tens of thousands, hundreds of thousands, millions, and tens of millions denominational orders of the accumulator.

Figs. 9, 10, 11, and 12 show, respectively, the thousands, hundreds, tens, and units denominational orders of the tally impulse generator unit.

Figs. 13, 14, 15, 16, 17, and 18 show, respectively, the units, tens, hundreds, thousands, tens of thousands and hundreds of thousands denominational orders of the impulse generator.

Figure 21:
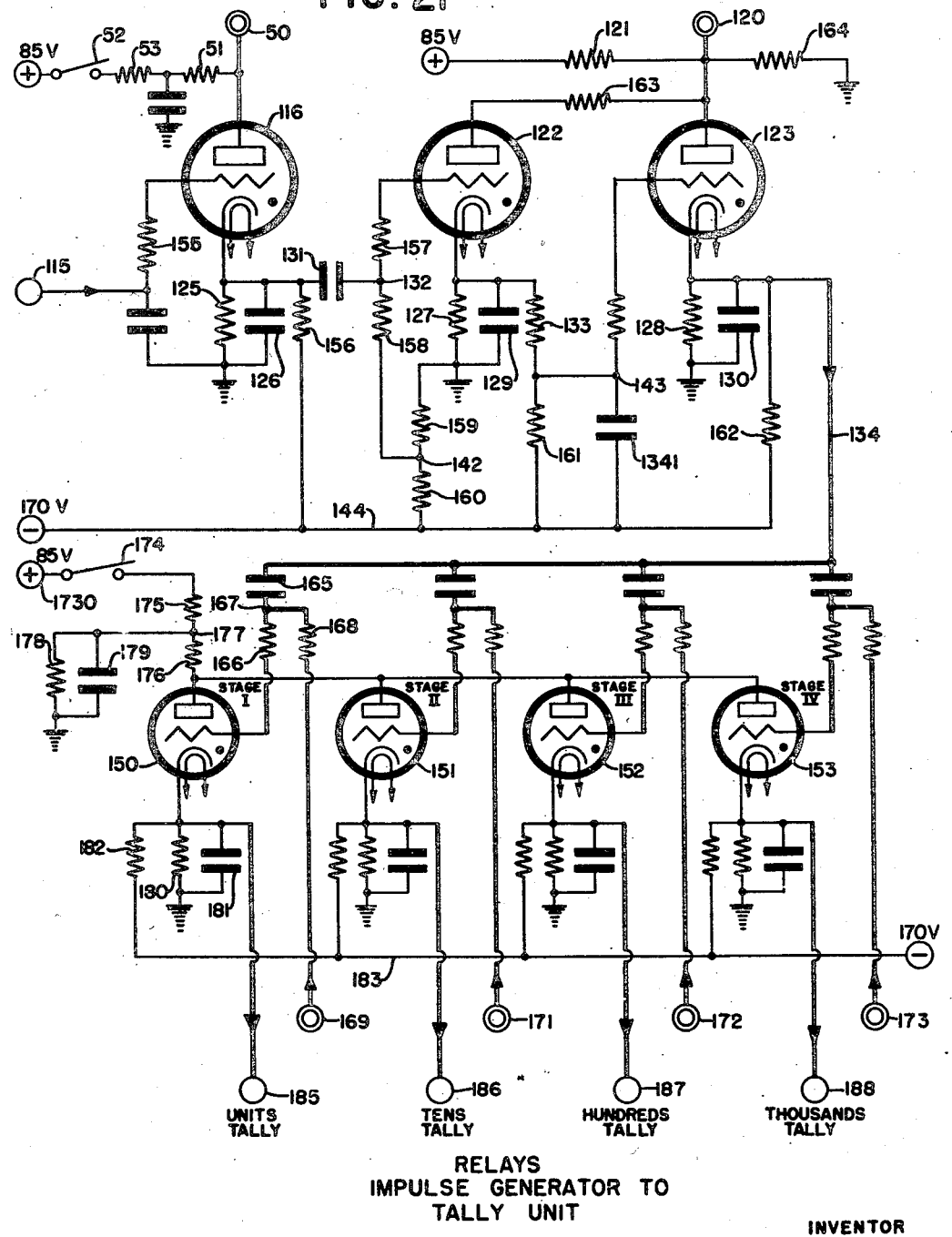

Fig. 21 includes the circuits coupling the impulse generator and the tally impulse generator unit to cause the tally unit to function a step at the conclusion of a cycle of the impulse generator.

Figure 22:
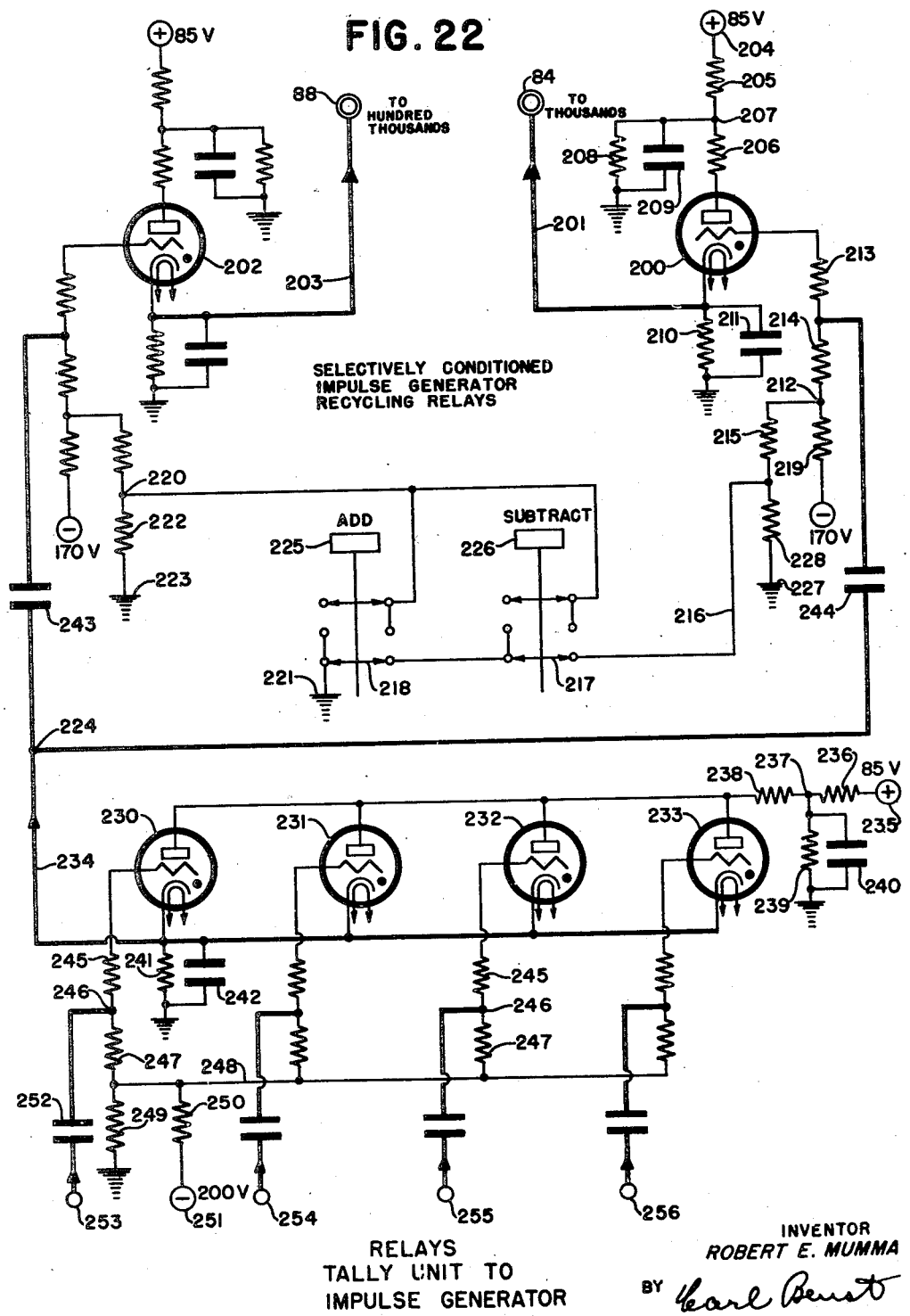

Fig. 22 includes the circuits for relaying the tally impulse generator unit recycling impulses to initiate cycles of operation of the impulse generator.

The gaseous triode electron tubes used in the disclosed embodiment of the invention, are of the thermionic cathode type having an anode, a cathode, and a control grid and having an internal potential drop during conduction of about 15 volts with the electrode elements so related that a tube will fire when the grid is more positive than about 12 to 20 volts negative with respect to the cathode, depending on the anode-cathode potential. Circuits for heating the cathodes are indicated only conventionally. These tube characteristics are true of all the gaseous tubes shown in the drawings.

Values of potential, resistance, and capacitance, as given, are relative and are given as one set of values which result in proper operation with the specified tubes, but are not to be deemed the only circuit values that can be used, as the principles involved in the invention permit of different levels for these relative values and of different relative values when electron tubes of other characteristics are used. Potentials given are with respect to ground potential.

*The impulse generator*

Figs. 13, 14, 15, 16, 17, and 18 show, respectively, the units, tens, hundreds, thousands, tens of thousands and hundreds of thousands denominational banks of the impulse generator. Each bank includes nine gaseous triodes (numbered "1," "2," "3," "4," "5," "6," "7," "8," and "9," respectively), representing the digits of an order of a decimal denomination, a gaseous triode, designated "D," which functions as a by-pass device, and a gaseous triode, designated "T," which functions to initiate the operation of another lower denominational bank of impulse generator tubes, or, in the case of the units bank, to initiate a step of operation of the tally impulse generator unit (see Figs. 9, 10, 11, and 12). The denominational banks of the impulse generator are linked together by the "T" tubes, or transfer tubes, and the banks are thus caused to operate serially from a higher beginning bank towards the units bank.

Figure 16:
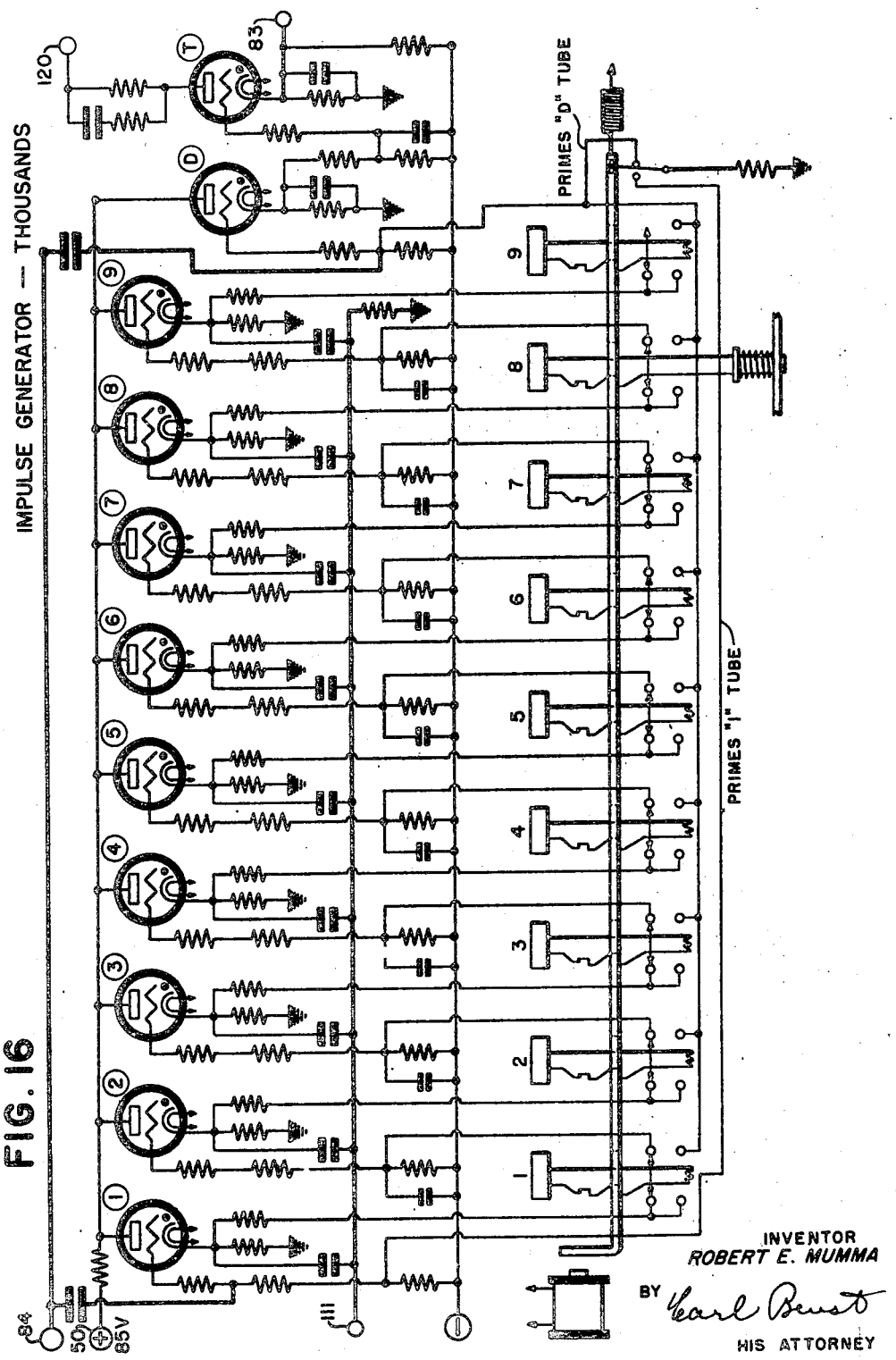

The number of impulses to be produced by each denomination of the impulse generator and sent to the accumulator is determined by operation of a selected digit key in selected banks of the impulse generator, the operation of a key acting to operate an associated switch to prepare certain digit tubes in each of such selected banks to operate. The digit keys are numbered in the drawings according to the digit tube with which each is associated. The selected digit tubes in a bank are fired and rendered conducting one at a time in sequence automatically after the initiating tube, which is the "1" tube, fires, and the operation of the bank is completed, after the selected tubes have fired, by the firing of the "D" tube and the "T" tube. As each digit tube is fired, an impulse is generated on an associated denominational output conductor. In case no key in a bank is operated, the "D" tube of the bank will fire to by-pass that bank by firing, in turn, the associated "T" tube. The "T" tube of each bank, except the units bank, by firing and becoming conducting, causes the initiating "1" tube or the "D" tube of the next lower denominational bank to fire. In multiplication, the highest two orders of the impulse generator—the hundred thousands order, (Fig. 18) and the ten thousands order (Fig. 17)—are not used and are by-passed by connections to be described, and the initiation of an operation constituting a cycle of a multiplying operation commences with the thousands bank (Fig. 16). The only reason for the elimination of the highest two orders of the impulse generator in multiplication is that the capacity of the accumulator, of the size disclosed, might be approached in a single multiplying operation or in several multiplying operations, if the factors were large. It is to be noted, however, that, by expanding the accumulator, such elimination of the higher denominations of the impulse generator need not be resorted to. In single cycle operations such as adding or subtracting all six banks of the impulse generator are used.

Each digit tube of a bank of the impulse generator is coupled, as has been said, to a common output conductor representing that bank, and, as each digit tube associated with such an output conductor is fired, it produces a positive electric potential impulse on said output conductor to be utilized to actuate the accumulator. The impulses on a particular output conductor thus have denominational significance and are routed in a given cycle of operation of the impulse generator to the proper denomination of the accumulator, automatically, by an electronic denominational impulse distributor (see Fig. 19) according to the stage of the calculation.

The key switch associated with each digit key controls the operation of the digit tubes of the associated bank to produce the selected number of impulses, and the associated keys numbered "1," "2," "3," "4," "5," "6," "7," "8," and "9," each control in a cycle the production of an equivalent number of impulses.

The units bank (Fig. 13) of the impulse generator group of banks will be used as an example of a typical bank of the group, as in essence all of the banks of the impulse generator are the same, with the exception of anode potential supply for the "D" tube and the "T" tube, the "D" and "T" tubes of the units bank having the same anode supply source as the associated digit tubes, whereas, in the higher banks, a separate anode potential supply source is provided for the "T" tube.

Figure 13:
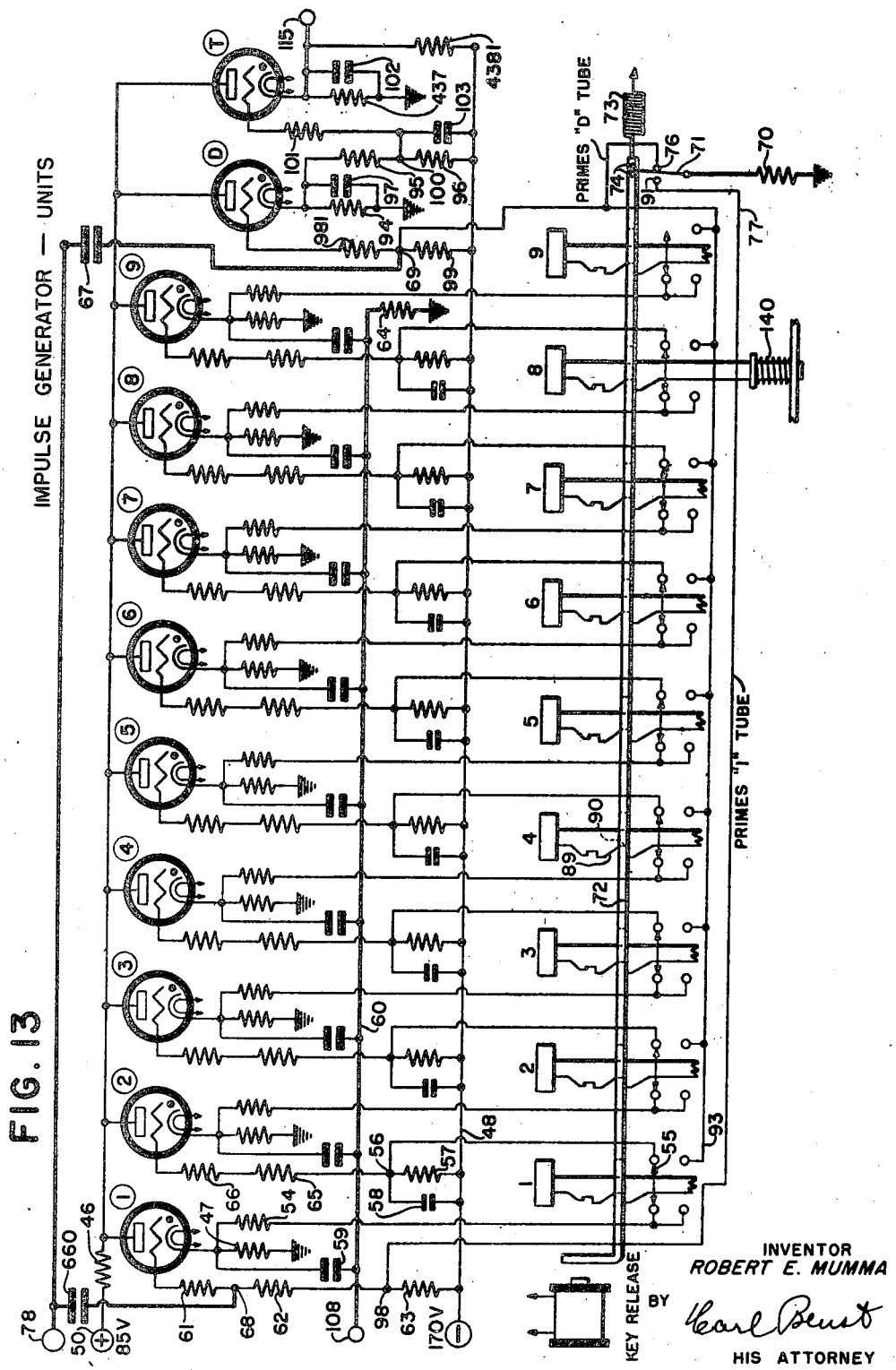

Referring to the units bank (Fig. 13), the anodes of all the tubes, including the digit tubes and the "D" and "T" tube, are connected to a source of potential of 85 volts positive through terminal 50 and resistor 46 of 1,000 ohms. Terminal 50 is common to all the banks of the impulse generator (see also Figs. 14, 15, 16, 17, 18) and obtains its potential through a resistor 51 (Fig. 21) of 4,000 ohms and a resistor 53 of 25 ohms on the closing of switch 52. The cathodes of each of the digit tubes of Fig. 13 are connected on one side to ground through a resistor such as resistor 47 of 25,000 ohms and are normally connected on the other side to a negative 170-volt conductor 48 through a resistor like resistor 54 of 60,000 ohms, a switch like switch 55, a point like point 56, and a resistor like resistor 57 of 100,000 ohms. Points like point 56 are coupled also to the negative supply conductor 48 through a capacitor like capacitor 58 of .002 microfarad. The cathode of each digit tube is connected, through a capacitor like capacitor 59 of .005 microfarad, to an output conductor 60, which is connected to terminal 108 and grounded through resistor 64 of 100,000 ohms. It will be apparent that, when any one of these digit tubes fires and is rendered conducting, due to the resistance in the cathode supply, there will be a positive rise in potential of the cathode, which will be impressed through the capacitor to the output conductor, and consequently said output conductor 60 and terminal 108 receives a positive potential impulse signal for each digit tube of the bank, as it fires and becomes conducting. Terminals 109 (Fig. 14), 110 (Fig. 15), 111 (Fig. 16), 112 (Fig. 17), and 113 (Fig. 18) are the output terminals for the tens, hundreds, thousands, ten thousands and hundred thousands banks of the impulse generator, respectively.

The grid of each digit tube (Fig. 13) is connected to the negative 170-volt conductor 48 through a resistor like resistor 61 of 50,000 ohms, a resistor 62 of 500,000 ohms, and a resistor 63 of 100,000 ohms. Thus each digit tube grid is normally heavily biased against conduction. The resistor corresponding to resistor 63 for the grids of the digit tubes of higher value—for instance, resistor 57 associated with the "2" tube—normally constitutes part of the cathode supply circuit of the next lower value tube.

Switches, such as switch 55, in the normal unoperated condition as shown in the drawings connect the cathode of its associated tube with the control grid of the next higher tube, and hence, for instance, if the "1" tube fires, the rise in its cathode potential is impressed in part through resistor 54, switch 55, point 56, resistor 65, and resistor 66, and will be sufficient to overcome the controlling bias on the "2" tube grid and cause it to fire and become conducting. As each digit tube fires, the initial current through it is high during the time the capacitor connecting the cathode to the output conductor 60 is being charged, and the common anode resistors such as resistors 46 (Fig. 13) and 51 and 53 (Fig. 21) cause the anode of the tube commencing to conduct to drop sharply in potential momentarily, which potential drop is impressed on the anodes of all the associated digit tubes, and, in the case of the units bank, on the anodes of the "D" tube and the "T" tube as well. Any conducting digit tube will be extinguished as another tube of the bank fires, because, if a tube has been conducting, the capacitor connecting its cathode to the output conductor will have been charged, and, as its anode drops in potential due to another tube firing, its cathode will be sustained temporarily at a relatively high level, and the anode potential will fall below the potential of the cathode, causing the tube to deionize, allowing the control grid to resume control. This method of extinction of a conducting tube by means of causing its anode potential to drop below cathode potential when another tube on the common anode supply circuit fires has been disclosed in my copending application for United States Letters Patent, Serial No. 395,995, which was filed May 31, 1941, and which issued on June 4, 1946, as Patent No. 2,401,657.

When the "1" tube in a bank fires and becomes conducting, there is no other tube in that bank at that time conducting, so the extinguishing action in a particular bank is operative when those tubes higher than the "1" tube in a bank become conducting; as, for instance, if the "1" tube is conducting and the "2" tube is fired automatically thereafter, that firing of the "2" tube will extinguish the "1" tube. However, when the "1" tube or any other digit tube in a bank fires, the potential of terminal 50 receives a momentary dip which is impressed on the anodes of all tubes in other banks connected thereto. This effect on other banks will extinguish any conducting digit tube therein.

If no key in a bank is operated, that bank is by-passed as far as the digit tubes are concerned, and only the "D" tube of that bank will fire, followed by the firing of the "T" tube. The firing of the "T" tube ends the operation of the bank and passes on an impulse to the next lower bank, which impulse is created by the rise in potential of its cathode as conduction commences in the tube. The impulse generator is arranged in this disclosure to operate bank by bank in sequence from the highest order bank to the lowest order bank, to prevent any interference in transfer of carry-over data in the accumulator, and therefore the "T" tube output of any particular bank is connected to the input conductor of the next lower bank, except that the units bank output terminal 115 is connected to the tally unit operation initiating unit relay (Fig. 21), to be described, either to initiate a recycling of the whole operation of the impulse generator or to cause it to cease operating, as at the end of a calculation.

To commence the operation of a bank of the impulse generator, provision has been made that, if no key in the bank is operated, the normally controlling potential bias of the "D" tube is relieved, or primed, to near the firing point, and, if a key in the bank is operated, the normally controlling bias of the "1" digit tube is relieved or primed to firing point. To actually start the operation of a bank, a positive potential impulse must be impressed on an input terminal, such as terminal 78 (Fig. 13), serving the units bank, which impulse is impressed through capacitors 660 of .0001 microfarad and 67 of .001 microfarad, capacitor 660 being connected to grid bias point 68 of the "1" tube and capacitor 67 being connected to grid bias point 69 of the "D" tube. The positive potential impulse starting an operation of the bank, therefore, tends to cause both the "1" tube and the "D" tube to fire and become conducting.

The priming of the "D" tube when no key is depressed is arranged to make it and not the "1" tube responsive to the starting impulse. When a key is depressed the "1" tube is arranged to be responsive to a starting impulse, and not the "D" tube. Still taking the units bank Fig. 13 as an example, the selective priming potential for the "D" and "1" tubes of the bank is obtained from ground through resistor 70 (Fig. 13) of 100,000 ohms and switch 71. A key detent bar 72 is normally maintained in the position shown in Fig. 13 by a spring 73, and studs 74 thereon hold switch 71 against the contact 76 conveying ground potential through to point 69, priming the "D" tube. If a key in the bank is operated, as, for instance, the "4" key, a cam surface 89 thereon operates against the surface 90 inside the key slot to move the bar 72 to the left, which moves switch 71 to contact 91, thus, through conductor 77, priming point 98 leading to the "1" tube grid bias point so that the "1" tube will respond to a starting impulse and the "D" tube will not respond. The input starting impulse impressed on terminal 78 is adjusted to differentiate between the primed and unprimed tubes.

Another function of the operation of any key is to break the normal connection between the cathode of its associated tube and the control grid of the next higher tube in the bank and to connect the said cathode of the tube associated with the key to the control grid of the "D" tube. Thus, digit tubes in a bank, if any are selected by operation of a key, will fire automatically one at a time in sequence, beginning with the "1" tube and ending with the tube associated with the operated key, impressing on the associated output conductor the number of impulses represented by that key. Thereafter the "D" tube is fired, followed by the "T" tube, to conclude the operation of the bank.

For instance, if key "1" is operated, switch 55 will bridge the lower contacts and connect the cathode of the "1" tube to conductor 93, which leads to point 69, which is the grid bias point of the "D" tube. Point 69, when it receives a potential from grounded contact 76, is only primed, but the potential impulse which it receives over conductor 93 from the last tube to fire, of the digit tubes selected, is great enough even in the unprimed condition of the "D" tube to cause the grid to lose control and consequently cause the firing of the "D" tube. The capacitors associated with the negative potential supply circuit of the grids of the digit tubes in a bank higher than the "1" tube, such as capacitor 58 connecting grid bias point 56 of the "2" tube to the negative 170-volt conductor 48, delay, for a short period while charging, the firing of the next digit tube after the commencement of conduction in the preceding tube. Consequently, such capacitors, as capacitor 58, control the timing of the output impulses from the impulse generator, and, with the values of circuit elements and potentials given, the interval involved between any two output impulses in the same bank is of the order of .0001 second. It is apparent, however, that timing adjustments may be made to satisfy any desired speed of operation up to the limit of the tube response.

The "D" tube (Fig. 13) obtains its cathode potential on one side from ground through a resistor 94 of 25,000 ohms and on the other side from the negative 170-volt conductor 48 through resistors 95 of 60,000 ohms and 96 of 100,000 ohms. The cathode is also connected to ground through capacitor 97 of .001 microfarad to cause the drop in the anode supply conductor to extinguish the last digit tube to fire on the event of the firing of the "D" tube. The value of grid resistor 981 is 50,000 ohms, and the value of resistor 99 is 100,000 ohms. Point 100 is connected to the grid of the "T" tube through resistor 101 of 50,000 ohms to furnish it with its normal controlling bias. The cathode of the "T" tube obtains its potential from ground through resistor 437 of 25,000 ohms, which is in parallel with a capacitor 102 of .001 microfarad and through its connection over resistor 4381 to negative 170-volt conductor 48. The rise in potential of point 100 as tube "D" fires automatically fires the "T" tube. Capacitor 103, of .005 microfarad, is a timing capacitor, delaying the firing of the "T" tube for an interval after the firing of the "D" tube.

Figure 14:
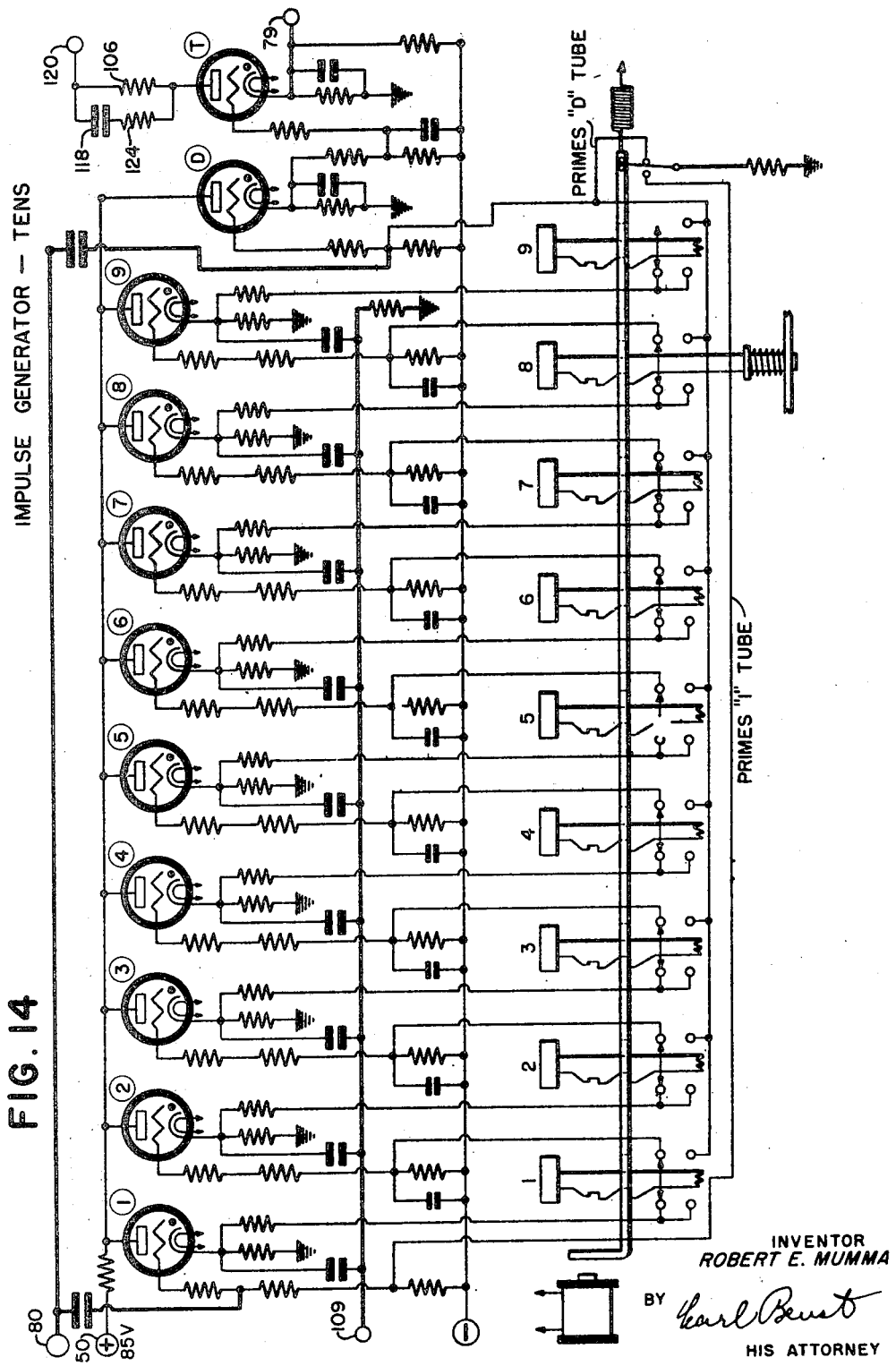

The anode potential supply of the "T" tubes in the banks higher than the units bank are separate from that of the digit and "D" tubes of the bank and, referring to Fig. 14 as typical, receive their anode potential through a common point 120 (see also Fig. 21) each through a resistor, like resistor 106, of 250,000 ohms. Each resistor, like resistor 106, is shunted by a capacitor, like capacitor 118 of .005 microfarad, in series with a resistor, like resistor 124 of 5,000 ohms. Referring to Fig. 21, terminal 120 is connected to an 85-volt potential source through a resistor 121 of 10,000 ohms and is connected to ground through a resistor 164 of 8,000 ohms. Therefore, the "T" tube of the tens bank when fired stays conducting until tube 123 (Fig. 21) fires and becomes conducting, as will be explained, and the "T" tubes of the banks higher than the tens bank will be extinguished on the event of the "T" tube of the next lower bank firing, due to the common anode resistance (see Fig. 21) and the individual cathode-ground capacitors. The "T" tube of the units bank is extinguished by the event of the firing of the tube 116 (Fig. 21), which event is initiated by reason of the cathode rise in potential of the units "T" tube (Fig. 13) being impressed on terminal 115 (Figs. 13 and 21).

It will be understood, then, that the banks of the impulse generator fire in sequence from the higher orders toward the units order, the digit tubes in banks in which keys have been operated firing sequentially in the bank, followed by the firing of the "D" tube and the "T" tube. In the case of a bank in which no key has been operated, then only the "D" tube and the "T" tube of that bank will be rendered conducting in succession.

At the end of a calculating operation, the key release solenoid for each bank will be activated and return the keys to home position under the action of individual springs, such as spring 140 (Fig. 13).

Figure 15:
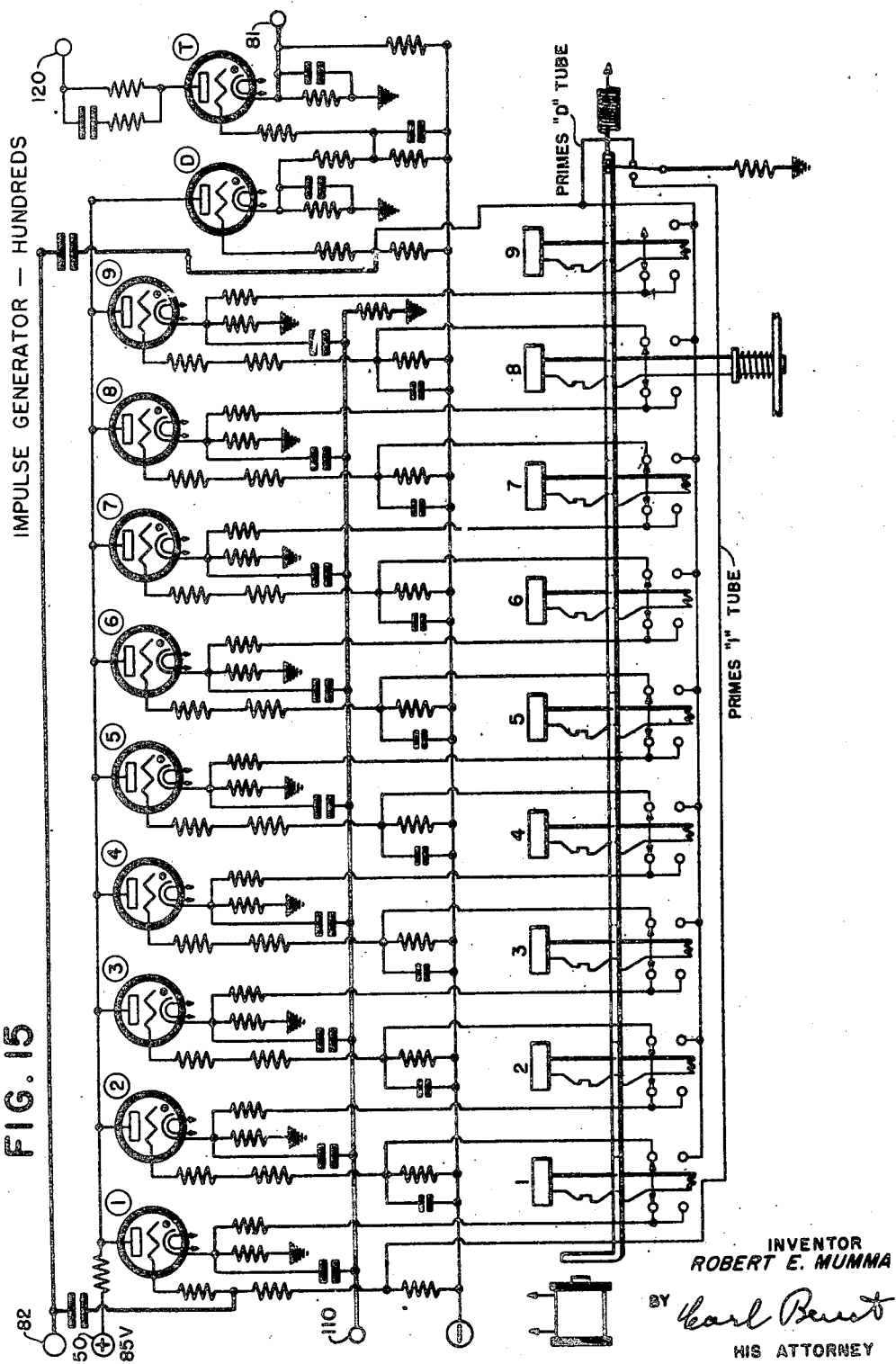
Figure 17:
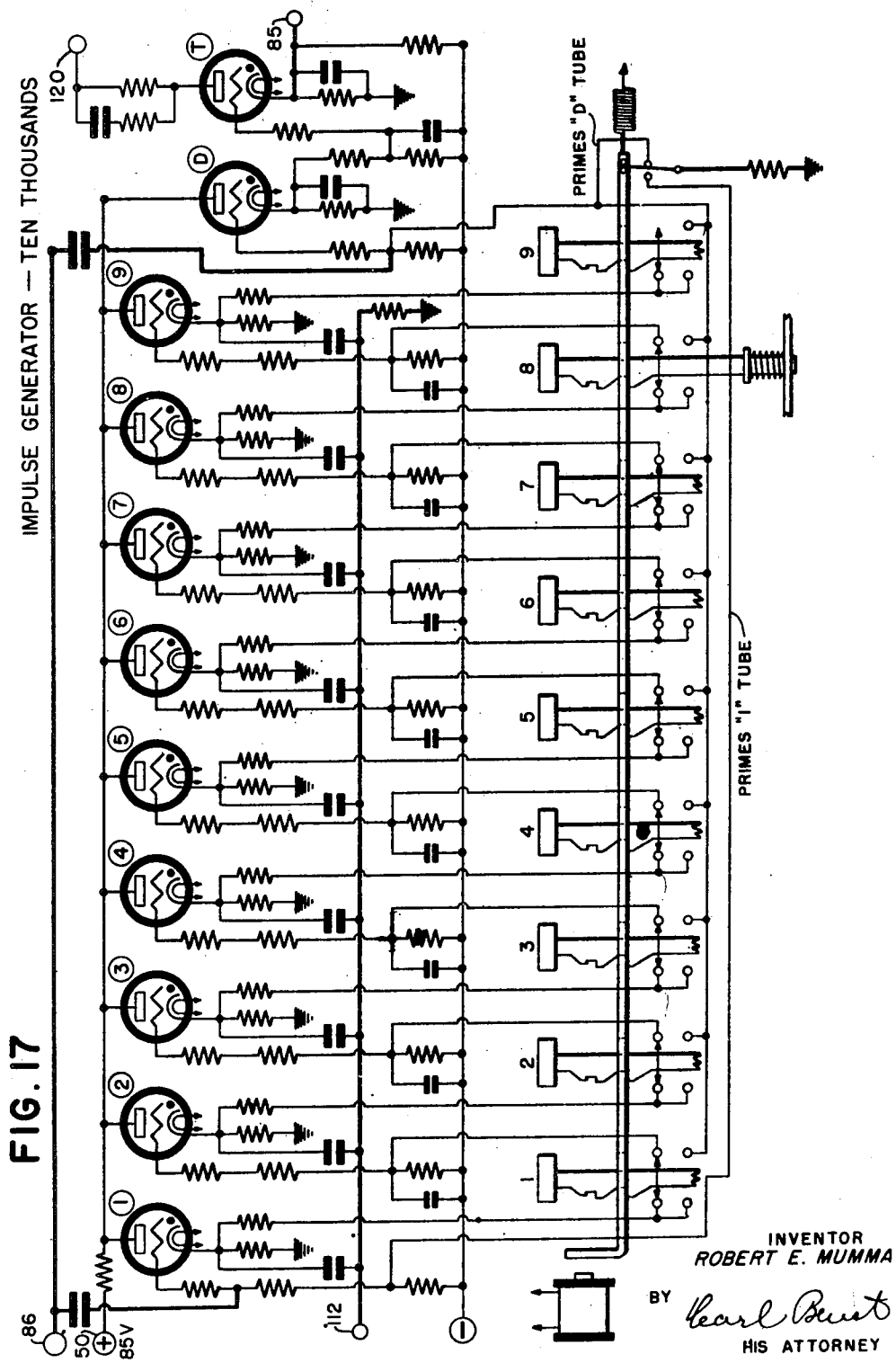
Figure 18:
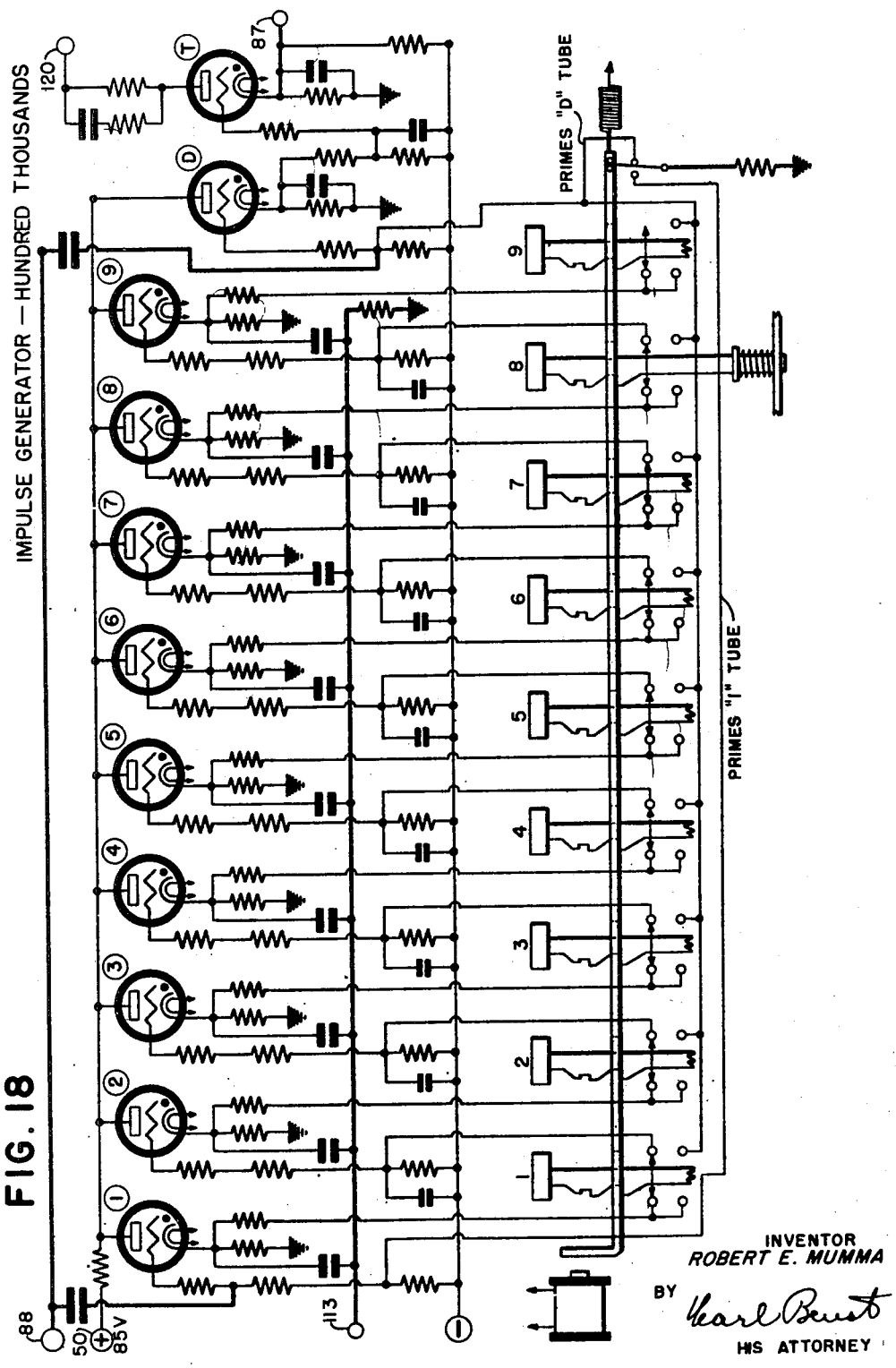

The operation of the impulse generator in single entries into the accumulator, such as in addition and subtraction operations, is initiated by a potential impulse applied to terminal 88 of the hundred thousands bank (Fig. 18). The output from its "T" tube at terminal 87 is connected to the input terminal 86 of the ten thousands bank (Fig. 17). The output terminal 85 of the "T" tube of the ten thousands bank is connected to the input terminal 84 of the thousands bank (Fig. 16). The output terminal 83 of the "T" tube of the thousands bank is connected to the input terminal 82 of the hundreds bank (Fig. 15). The output terminal 81 of the "T" tube of the hundreds bank at terminal 81 is connected to input terminal 80 of the tens bank (Fig. 14). The output terminal 79 of the "T" tube of the tens bank is connected to the input terminal 78 of the units bank (Fig. 13).

In calculating operations requiring a succession of entries into the accumulator, such as multiplying, the higher two banks of the impulse generator are by-passed, as has been said, and initiation of a multiplying operation is commenced by impressing the initiating positive impulse on terminal 84 (Fig. 16), as will be explained.

It is evident that the impulse generator is not restricted in principle to the decimal numerical base, as any number of digit tubes may be placed in each bank. Neither is the impulse generator restricted in the number of banks used.

The impulse generator is recycled as many times as selectively determined by the tally impulse generator unit, and the output impulses of any one cycle are routed as determined by the stage of the calculation to the proper denominational orders of the accumulator.

The closing of switch 52 (Fig. 21) prepares the impulse generator for operation by supplying anode potential to the digit tubes.

*Relaying end of operation impulses from impulse generator to tally unit*

Tubes 116, 122, and 123, (Fig. 21) prepare the impulse generator for another cycle and initiate operation of the tally unit.

Each of the tubes 116, 122, and 123 (Fig. 21) has its cathode grounded on one side through a resistance, like resistance 125, in parallel with a capacitor like capacitor 126. Resistors 125, 127, and 128 are, respectively, of 50,000 ohms, 25,000 ohms, and 60,000 ohms, and capacitors 126, 129, and 130 are, respectively, of .004 microfarad, .0005 microfarad, and .002 microfarad. On the other side, each of the cathodes is connected to a negative 170-volt conductor 144 through a resistor or resistors, said resistors having the following values, resistor 156—150,000 ohms, resistor 133—25,000 ohms, resistor 161—150,000 ohms, and resistor 162—500,000 ohms. The cathode of tube 116 is coupled through a capacitor 131 of .0001 microfarad in series with resistor 158 of 250,000 ohms to grid bias point 142 of tube 122; the cathode of tube 122 is connected through resistance 133 to grid bias point 143 of tube 123; and the cathode of tube 123 is connected to input conductor 134 for the relay tubes 150, 151, 152, and 153, each associated with a denomination of the tally impulse generator to be discussed later. Capacitor 1341 is provided as a time delay and may be of .01 microfarad. The grid of tube 116 receives its normal bias potential and firing potential from the cathode of the "T" tube of the units bank of the impulse generator through terminal 115 (Figs. 13 and 21) which has a normal potential of about 22 volts negative, when the "T" tube is not conducting, being connected to ground through 60,000-ohm resistor 437 and connected to the negative 170-volt supply conductor 48 through 400,000-ohm resistor 4381. The grids of tubes 122 and 123 (Fig. 21) receive their controlling grid bias potential from points 142 and 143, respectively, each being positioned in a potential divider located between negative 170-volt supply conductor 144 and ground. Resistors 159 and 160 are of 40,000 ohms and 100,000 ohms respectively, resistances 133 and 161 have been specified before. The anodes of tubes 122 and 123 receive potential from point 120, the anode of tube 122 being isolated by resistor 163 of 7,500 ohms. Suitable values for resistors 155 and 157 are 500,000 ohms and 50,000 ohms respectively. With such circuit values, the tubes 116, 122, and 123 fire one after another when the cathode potential rise, resulting from the units bank impulse generator "T" tube firing (Fig. 13), is impressed on terminal 115 (Figs. 13 and 21). The circuit values of capacitance and distributed inductance incident to normal wiring, and the combination of low resistance in the anode supply circuit with high resistance in each tube's cathode supply circuit shunted by a capacitor, immediately cause each of the said tubes 116 and 123 to self-extinguish after it fires, as the initial high initial current flowing through a tube during the time the cathode capacitor is charging causes an ensuing oscillatory rise in cathode potential as the high tube current is abruptly terminated, which rise overshoots the anode potential. Tube 122 is extinguished on the firing of tube 123 as the common anode supply point drops in potential. Therefore, each of these tubes 116, 122, and 123, after firing, is reset ready for another operation.

Tubes 150, 151, 152, and 153 are individually primable gaseous triode tubes, used as relays, and are each arranged in a circuit having self-extinguishing action similar to the circuits of tubes 116, and 123. Sufficient anode-cathode potential is given constantly to all of the tubes 150, 151, 152, and 153 to maintain conduction therein, but the grids of the tubes are normally biased to prevent firing even when a positive potential impulse over input conductor 134 is impressed commonly on the grids, each grid being connected to conductor 134 through a capacitor of .00025 microfarad, like capacitor 165, in series with a resistor of 50,000 ohms, like resistor 166. The grid bias potential is supplied to each grid individually at a point, like point 167, through a resistor like resistor 168 of 250,000 ohms, and a terminal, like terminal 169 (see also Fig. 20). Terminal 169 (Fig. 20) is connected to the potential supply circuit of the cathode of tube 1920, and the potential of terminal 169, due to the resistance in the cathode potential supply of tube 1920, is raised when tube 1920 is conducting as compared to when tube 1920 is in non-conducting condition. Such rise in potential primes the grid of tube 150 (Fig. 21) to a point where it is fired by an impulse impressed on conductor 134. In a similar manner, terminals 171, 172, and 173 (see also Fig. 20) are similarly primed by conduction, respectively, in tubes 2070, 2060, and 2050. More will be said about tubes 1920, 2070, 2060, and 2050 in connection with the description of the stage control unit of which tubes 1920, 2070, 2060, and 2050 (Fig. 20) are a part and which controls the denominational distribution of the impulses issuing from the impulse generator, so that the repeated entries of the generated impulses are properly routed to the various denominations of the accumulator. The anodes of tubes 150, 151, 152, and 153 (Fig. 21) receive their potential supply from 85 volt positive source 1730 through resistor 175 of 50,000 ohms, and resistor 176 of 1,000 ohms, after the closing of switch 174. Point 177 is grounded by resistor 178 of 15,000 ohms in parallel with capacitor 179 of .01 microfarad introduced into the circuit to insure stability of potential supply. Each cathode is grounded through a resistor like resistor 180 of 60,000 ohms shunted by a capacitor like capacitor 181 of .001 microfarad, and each is connected to negative 170 volt conductor 183 through a resistance, like resistance 182 of 250,000 ohms. The stated values of circuit elements of resistance and capacitance with the distributed inductance in normal wiring will cause any one of the tubes to immediately self-extinguish when fired, due to the oscillatory rise in potential of the cathode, as has been explained for other tubes. Each time the impulse generator completes a cycle, that one of the tubes 150, 151, 152, and 153 which is primed fires and self-extinguishes, passing on a positive potential impulse on the associated one of the cathode output terminals 185, 186, 187, and 188, to cause a step of operation of an associated denomination of the tally unit impulse generator, as will be described.

*The accumulator*

The accumulator shown in Figs. 1, 2, 3, 4, 5, 6, 7, and 8 includes eight denominational electron tube counting rings, one denominational ring shown in each figure, each ring including ten digit-representing gaseous triode electron tubes for the digits "0," "1," "2," "3," "4," "5," "6," "7," "8," and "9." A transfer tube "T" is provided for each except the highest denominational ring, for creating an electric impulse to carry over a unit of data to the next higher denominational order, which event occurs on the next impulse received after the "9" digit tube is conducting in adding entries, or on the next impulse received after the "0" tube is conducting in subtracting entries. The transfer tube T is omitted from the highest order as unnecessary. The accumulator counting rings may be described as of the parallel cathode extinction type mentioned before, as all the digit tube cathodes are coupled electrostatically to a common extinguishing conductor. The tubes in a ring are rendered conducting one at a time in sequence in response to electric potential impulses commonly impressed, electrostatically, on the control grids of the digit tubes and the control grid of the "T" tube. The conducting condition of a tube primes the next tube in the ring to become conducting on the next commonly received impulse, and the act of a tube becoming conducting, because of the electrostatic coupling of each cathode in parallel to a common conductor and the presence of a resistor in each cathode supply causes the extinction of conduction in the previously conducting tube of the ring by forcing its cathode potential to a point more positive than its anode potential. The direction of the inter-tube priming connections determines whether the ring operates in a forward manner, or in a reverse manner, and the connection of the digit tubes to the "T" tube determines on what impulse a carry-over transfer is made.

An explanation of the structure and operation of one ring will give an understanding of the structure and operation of all the rings of the accumulator.

With reference to the units denominational bank (Fig. 1), the digit-representing tubes are numbered on the drawings according to their digit value in the denomination. Each is a gaseous triode of the type described as standard in the device. Anode potential of 150 volts is applied at terminal 1190, which is routed to the digit tube anodes through resistor 1200 of 10,000 ohms. Terminal 1190 is connected to ground through resistor 1210 of 120,000 ohms and resistor 1220 of 100,000 ohms in parallel with capacitor 1240 of .01 microfarad. Point 1230, which supplies anode potential for the "T" tube, is thereby given a normal positive potential of about 68 volts. The cathode potential of the "T" tube is derived from point 1270, which is connected to ground through resistor 1250 in parallel with capacitor 1260 of 25 micromicrofarads, and connected to the negative 200-volt supply conductor 1300 through resistor 1340 of 230,000 ohms. When said "T" tube becomes conducting, there immediately ensues an oscillatory phenomenon in the anode-cathode circuit which causes the cathode to rise in potential to a point, which results in a temporary cessation of anode-cathode potential and extinguishment of conduction in the tube, as has been described in connection with other self-extinguishing tubes.

Each of the digit tube cathodes obtains its potential from a point, like the "8" tube cathode point 1280, which is connected on one side to ground through a resistor, like resistor 1290, of 25,000 ohms, and connected on the other side to the negative 200-volt supply conductor 1300 through a resistor, like resistor 1310, of 63,000 ohms, a point like point 1320, and a resistor like resistor 1330 of 50,000 ohms. Each digit tube grid is given a normal controlling bias by being connected to a point in the cathode supply circuit of an adjacent tube, said cathode point being that of the adjacent tube of lower digit value in the case accumulator is adjusted for adding entries, and said cathode point being that of the adjacent tube of higher digit value in the case the accumulator is adjusted for subtracting entries. For instance, grid priming supply point 1320 of the "8" tube cathode is connected, in adding operations, through terminal 1350, switch 1360, and terminal 1370, to prime the "9" tube grid through resistor 1380 of 100,000 ohms, point 1390, and resistor 1400 of 10,000 ohms. When the switch key 1430 is moved from "add" position to "subtract" position, the "9" tube grid is primed by the "0" tube cathode priming supply terminal 1410, as switch 1360 is moved to contact 1435. During the travel of a switch, such as switch 1360, from one contact to another, it is supplied with sufficient negative potential through a contact, like contact 1431, connected to the negative supply conductor 1300, to maintain a controlling bias on the grid of the associated tube preventing anomalous firing of the accumulator tubes.

The transfer tube "T" grid is primed by potential applied to terminal 1471, which in adding position of key switch 1430 obtains its priming potential through switch 1480, in the position shown, and terminal 1490 leading to the "9" tube cathode. In subtracting operations, the switch 1480 is moved to its other contact 1481 and thus terminal 1471 receives its prime from point 1500, connected to prime supply point 1433 of the cathode of the "0" tube. The movement of key 1430 from "add" position to "subtract" position, in a similar manner, causes the cathode priming point of each tube in the bank to change contacts so as to prime the next lower digit tube instead of the next higher digit tube. There is a key 1430 for each bank of the accumulator.

Positive potential impulses impressed on a bank input terminal, like terminal 1600, are impressed commonly on the grid each of digit tube and the transfer tube, each through an input capacitor such as capacitor 1610 of .00005 microfarad. The impulses will each cause the primed tube to conduct and consequently will cause the digit tubes to become conducting one at a time in sequence in an endless chain manner.

As a "T" tube fires and becomes conducting when a bank has exceeded its capacity, an impulse is taken from its cathode and transmitted through suitable connections to the input conductor for the next higher denomination. For instance, terminal 1436 (Fig. 1) is connected to input terminal 1630 (Fig. 2).

Assuming the anode potential to be applied to a bank and assuming no tube to be conducting or a significant digit tube to be conducting, a switch like switch 438 (Fig. 1) may be closed temporarily to cause the "0" tube to become conducting by grounding its grid, registering zero in that bank of the accumulator and priming the "1" tube to become conducting on receipt of the next input impulse in case of an adding position of switch 1430 or priming the "9" tube and "T" tube to become conducting in case of a subtracting condition of switch 1430.

The firing of the "0" tube will extinguish any other significant digit tube which may be conducting when switch 438 is operated.

Conventional switching means may be provided to simultaneously switch the direction of prime for all the banks to prepare for the forward or the reverse direction operation of the accumulator. For example, key 226 (Fig. 22) may be used to mechanically operate all the "add-subtract" key switches in the accumulator. All the banks of the accumulator operate in the same manner, and it is obvious that as many banks may be connected together as desired, eight being shown to more than accommodate the product of multiplying a four-digit number by a four-digit number, the multiplying capacity disclosed.

Figure 7:
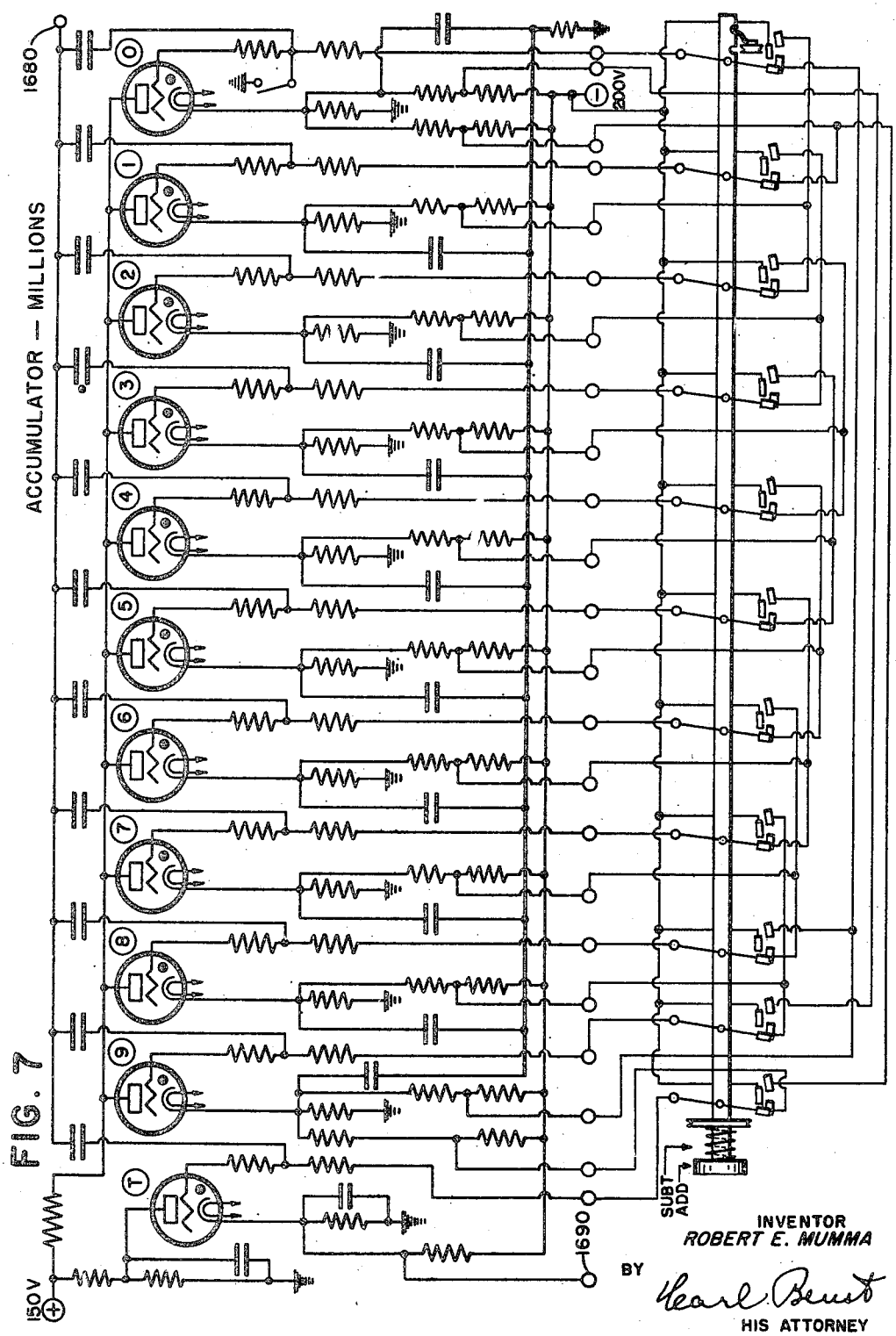
Figure 8:
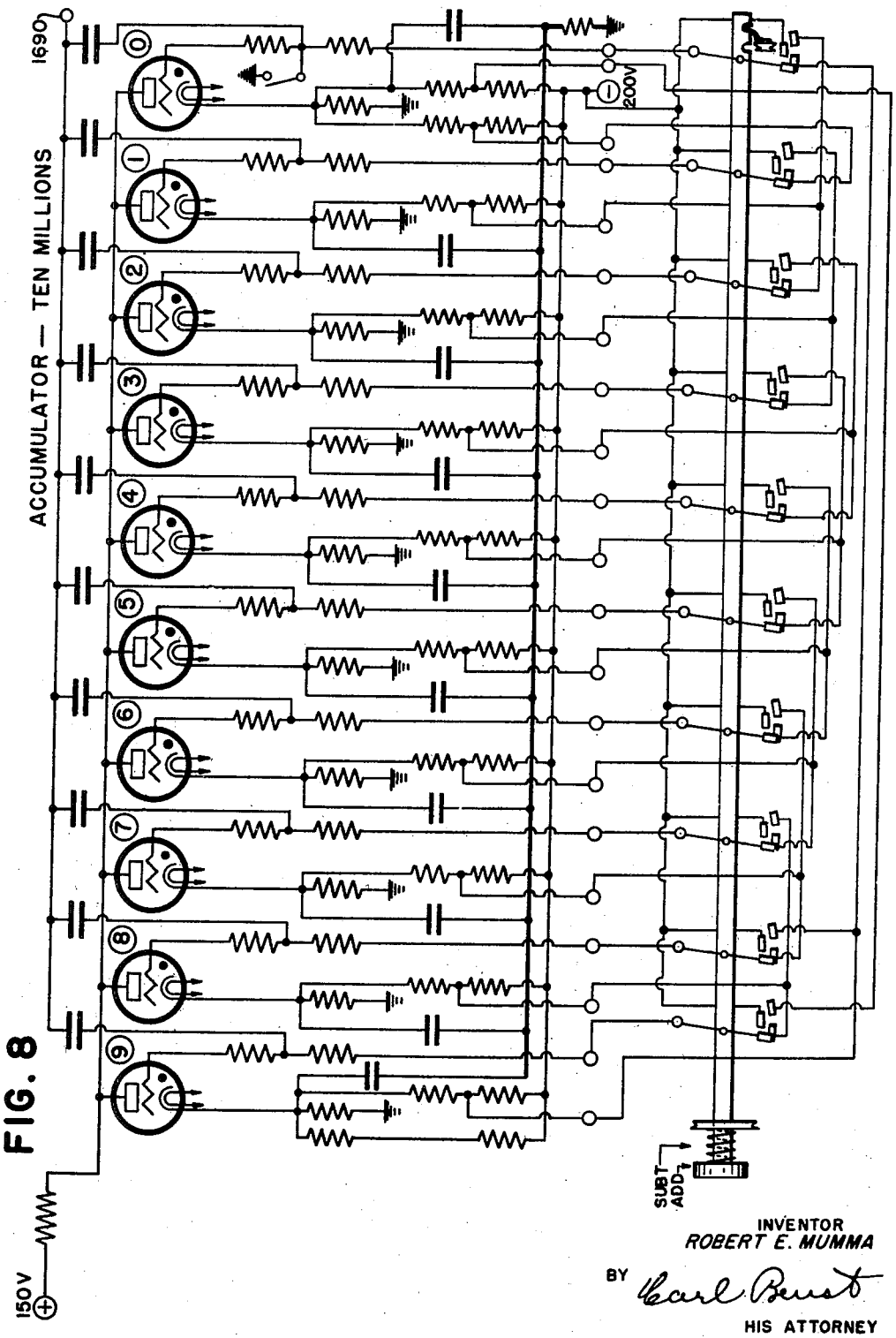

The input terminals for the eight denominational banks of the accumulator are as follows: for the units bank, terminal 1660 (Fig. 1); for the tens bank, terminal 1630 (Fig. 2); for the hundreds bank, terminal 1640 (Fig. 3); for the thousands bank, terminal 1650 (Fig. 4); for the tens of thousands bank, terminal 1660 (Fig. 5); for the hundreds of thousands bank, terminal 1670 (Fig. 6); for the millions bank, terminal 1680 (Fig. 7); and for the millions bank, terminal 1690 (Fig. 8).

The input impulses obviously must discriminate between primed and unprimed tubes. The circuit values gives permit use of impulses of about 10–20 volts.

The transfer tube output terminal of each bank of the accumulator above the units denominational order bears the same reference numeral as the input terminal of the next higher denominational order.

The denominational distributor

The denominational distributor (Fig. 19) relays and distributes the impulses generated by the impulse generator (Figs. 13 to 18) to the proper denominational orders of the accumulator according to the stage of calculation as determined by the stage control portion of the tally unit to be described hereafter.

Provision has been made for making entries produced by the impulse generator into any of the orders of the accumulator except the highest order. The highest order, tens of millions (Fig. 8), of the accumulator is used only for overflow data entered into it by operation of the millions order transfer tube (Fig. 7). The millions bank of the accumulator is the highest order in which product data resulting from multiplying two four-digit numbers need be entered. As many overflow orders may be used as desired.

The tubes of the denominational distributor are each members in three overlaid groupings. One grouping relates to tubes connected to the same output conductor. The second grouping relates to tubes having the same input conductor. The third grouping relates to tubes having the same grid priming conductor.

The accumulator terminals 1600, 1630, 1640, 1650, 1660, 1670, and 1680 (see Figs. 1, 2, 3, 4, 5, 6, and 7 for the accumulator connections, and Fig. 19 for the denominational distributor connections), each representing an output group of denominational distributor tubes (Fig. 19), are energized by positive potential output impulses as any tube of the denominational distributor associated therewith is fired. The tubes in the denominational distributor are individually firable, when both primed from the stage control unit and energized by an input impulse from the impulse generator, and, upon firing, become immediately extinguished by oscillatory phenomena in the anode-cathode circuit caused by circuit elements having the necessary values of resistance, capacitance, and distributed inductance, as has been previously described in connection with other self-extinguishing tubes. As a tube fires, it produces an impulse on the associated group output conductor, said impulse originating at the cathode of the firing tube.

Connected to the impulse generator output terminal 108 (Figs. 13 and 19) of the units order of the impulse generator is input conductor 1800 (Fig. 19) of the denominational distributor, to which the grids of gaseous triodes 1810, 1820, 1830, and 1840 of that input group are coupled, each through an individual capacitor like capacitor 1850 of .001 microfarad. The anode of each tube of the denominational distributor, like tube 1810, receives its potential from a terminal like terminal 1860 supplied with 70 volts positive potential through a resistor, like resistor 1870, of 1,500 ohms. The cathode of each such tube is grounded through a resistance, like resistance 1880, of 50,000 ohms, and is coupled to its associated output terminal, like terminal 1600, through a capacitor of .002 microfarad, like capacitor 1880a. The grid of each such tube receives its potential from a group stage control terminal like terminal 1890. Terminal 1890 is connected to the cathode network of a gaseous triode tube 1920 (Fig. 20) at a point 1930, which is maintained at about 68 volts negative when tube 1920 is non-conducting and which rises in potential to about 18 volts negative when tube 1920 is conducting. Tubes 1810, 2100, 2110, 2120, 2130 and 2140 (Fig. 19) all have their grids primed from terminal 1890 to constitute stage "I" priming group. Thus, when tube 1920 is conducting, tubes 1810, 2100, 2110, 2120, 2130, and 2140 (Fig. 19) are primed. The potential supply of point 1930 (Fig. 20) is derived as follows: connection is made on one side to a negative 170-volt supply conductor 1940, through resistor 1950 of 54,000 ohms, resistor 1970 of 12,500 ohms, and resistor 1990 of 2,500 ohms, and connection is made to ground on the other side through resistor 2000 of 7,500 ohms, resistor 2010 of 15,000 ohms, and resistor 2020 of 25,000 ohms. It is apparent, therefore, that, when tube 1920 is conducting, terminal 1890 rises considerably in potential, which is conveyed to the grids of tubes 1810, 2100, 2110, 2120, 2130, and 2140 (Fig. 19) to prime them. Otherwise these tubes are heavily biased against firing. Any tube thus primed is ready to be fired by a positive impulse impressed electrostatically on its control grid to the exclusion of any tube associated with it on the common input impulse conductor conveying impulses from the impulse generator. Thus, tube 1810 (Fig. 19) is fired by impulses impressed on its grid through terminal 108 if at that time terminal 1890 is given its potential rise by reason of tube 1920 (Fig. 20) being in a conducting condition. The other tubes, 1820, 1830, and 1840, associated with the same input conductor 1800 and receiving the same generated impulses from terminal 108, are not fired at the same time as tube 1810, as it is arranged that only one tube associated with a common input conductor, like conductor 1800, is in a primed condition at a given stage of the calculation. The priming tubes 2050, 2060, and 2070 and the before-mentioned tube 1920, all shown in Fig. 20, are fired one at a time in successive stages of calculation, and the conduction in each of the said tubes gives rise to one of the four stages of calculation under control of the tally unit, of which said priming tubes 2050, 2060, 2070, and 1920 constitute a part.

It will be understood from what has been explained that the control exercised by the priming tubes 2050, 2060, 2070, and 1920 (Fig. 20) determines where among the possible denominations in the accumulator the output from a given denomination of the impulse generator is to be entered. For instance, the input impulses on terminal 108 (Fig. 19), representing the units bank of the impulse generator, may be relayed to either the units, tens, hundreds, or thousands bank of the accumulator through the terminals 1600, 1630, 1640, and 1650 (Fig. 19), respectively. The impulses generated by the units denominational bank of the impulse generator, which are impressed on terminal 108 and conductor 1800 (Fig. 19) are impressed through the individual capacitors like capacitor 1850, before mentioned, onto the control grids of tubes 1810, 1820, 1830, and 1840, and one of those four tubes in a given stage of the calculation is primed, ready to be rendered conducting, and is rendered conducting, followed by self extinction, by each one of the generated impulses then received. The cathode of tube 1810 is coupled electrostatically to the terminal 1600 (see also Fig. 1) of the accumulator, and hence, when tube 1920 (Fig. 20) is conducting, the units generated impulses are relayed and routed to the units denomination of the accumulator. Tube 2070, when conducting (Fig. 20), primes the associated group of denominational distributor tubes 1820, 2160, 2170, and 2180 (Fig. 19) by reason of a rise in potential at point 2040 (Fig. 20), which rise is conveyed by terminal 2150 (see also Fig. 19). It will be seen, therefore, that, when priming tube 2070 is conducting, the units generated impulses will be relayed only by distributor tube 1820, which has its output terminal 1630 connected to the impulse input conductor of the tens bank of the accumulator (see Fig. 2).

The plan of operation of the denominational distributor is revealed from the foregoing description, and the functions of all of the tubes of the denominational distributor and the functions of the stage priming tubes will be given in tabular form, so that any routing of a produced impulse may be traced.

Denominational distributor tubes (Fig. 19) actuable by Units Bank of Impulse Generator—Fig. 13—terminal 108:
 (a) 1810 output to units accumulator—terminal 1600
 (b) 1820 output to tens accumulator—terminal 1630
 (c) 1830 output to hundreds accumulator—terminal 1640
 (d) 1840 output to thousands accumulator—terminal 1650

Denominational distributor tubes (Fig. 19) actuable by tens bank of generator—Fig. 14—terminal 109:
 (a) 2100 output to tens accumulator—terminal 1630
 (b) 2160 output to hundreds accumulator—terminal 1640
 (c) 2190 output to thousands accumulator—terminal 1650
 (d) 2200 output to ten thousands accumulator terminal 1660

Denominational distributor tubes (Fig. 19) actuable by hundreds bank of generator—Fig. 15—terminal 110:
 (a) 2110 output to hundreds accumulator—terminal 1640
 (b) 2170 output to thousands accumulator—terminal 1650
 (c) 2210 output to ten thousands accumulator—terminal 1660
 (d) 2220 output to hundred thousands accumulator—terminal 1670

Denominational distributor tubes (Fig. 19) actuable by thousands bank of generator—Fig. 16—terminal 111:
 (a) 2120 output to thousands accumulator—terminal 1650
 (b) 2180 output to ten thousands accumulator—terminal 1660
 (c) 2230 output to hundred thousands accumulator—terminal 1670
 (d) 2240 output to millions accumulator—terminal 1680

Denominational distributor tube (Fig. 19) actuable by tens of thousands bank of generator—Fig. 17—terminal 112:
 (a) 2130 output to ten thousands accumulator—terminal 1660

Denominational distributor tube (Fig. 19) actuable by hundred thousands bank of generator—Fig. 18—terminal 113:
 (a) 2140 output to hundred thousands accumulator—terminal 1670

Stage control priming tubes—Fig. 20
 Prime tube 1920 primes all the "a" tubes—terminal 1890
 Prime tube 2070 primes all the "b" tubes—terminal 2150
 Prime tube 2060 primes all the "c" tubes—terminal 2250
 Prime tube 2050 primes all the "d" tubes—terminal 2260

The two highest orders of the impulse generator being used, in this embodiment, only for adding or subtracting operations, only the denominational distributor tubes 2130 (Fig. 19) and 2140 are provided for relaying impulses from those denominations, there being no necessity for entering such generated impulses into more than one denomination of the accumulator, as is the case with calculating operations having stages wherein impulses may be required to be entered into several denominations.

The denominational distributor tubes have anode potential applied thereto in groups, each of which groups has the same output terminal which actuates, through one or another conducting tube of the group, a particular denominational bank of the accumulator. With the anode supply thus provided to output groups, the output impulses can be accurately adjusted as to amplitude so as to make it properly coordinated with the most effective input impulse amplitude range for the particular associated denomination of the accumulator. The suggested anode potential is 70 volts positive as applied, for instance, to terminal 1860, before mentioned, but adjustments may be made to fit the units together for optimum results. Similar anode voltages are applied to terminals 2330, 2320, 2310, 2300, 2290, and 2280.

Figure 1:
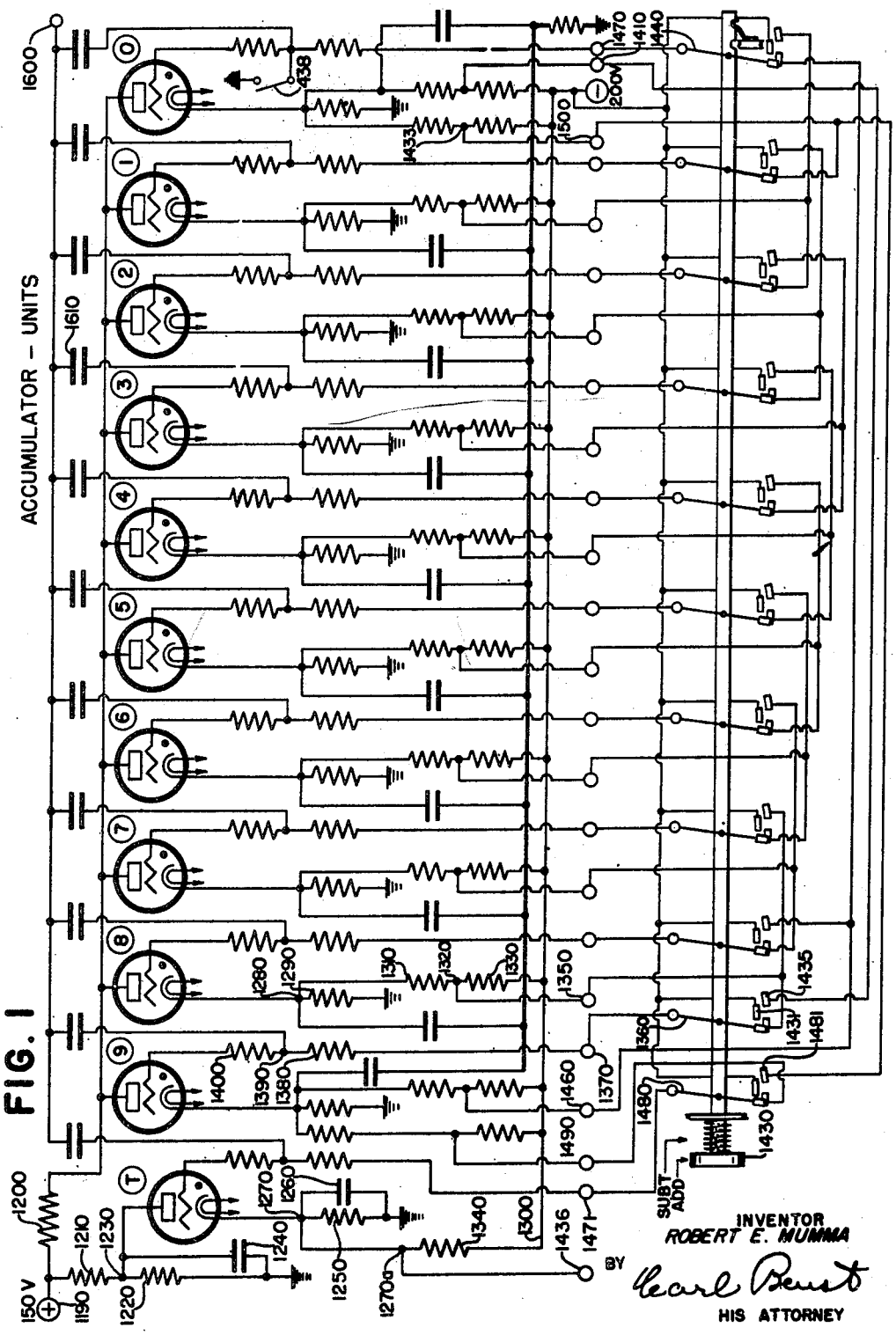
Figure 3:
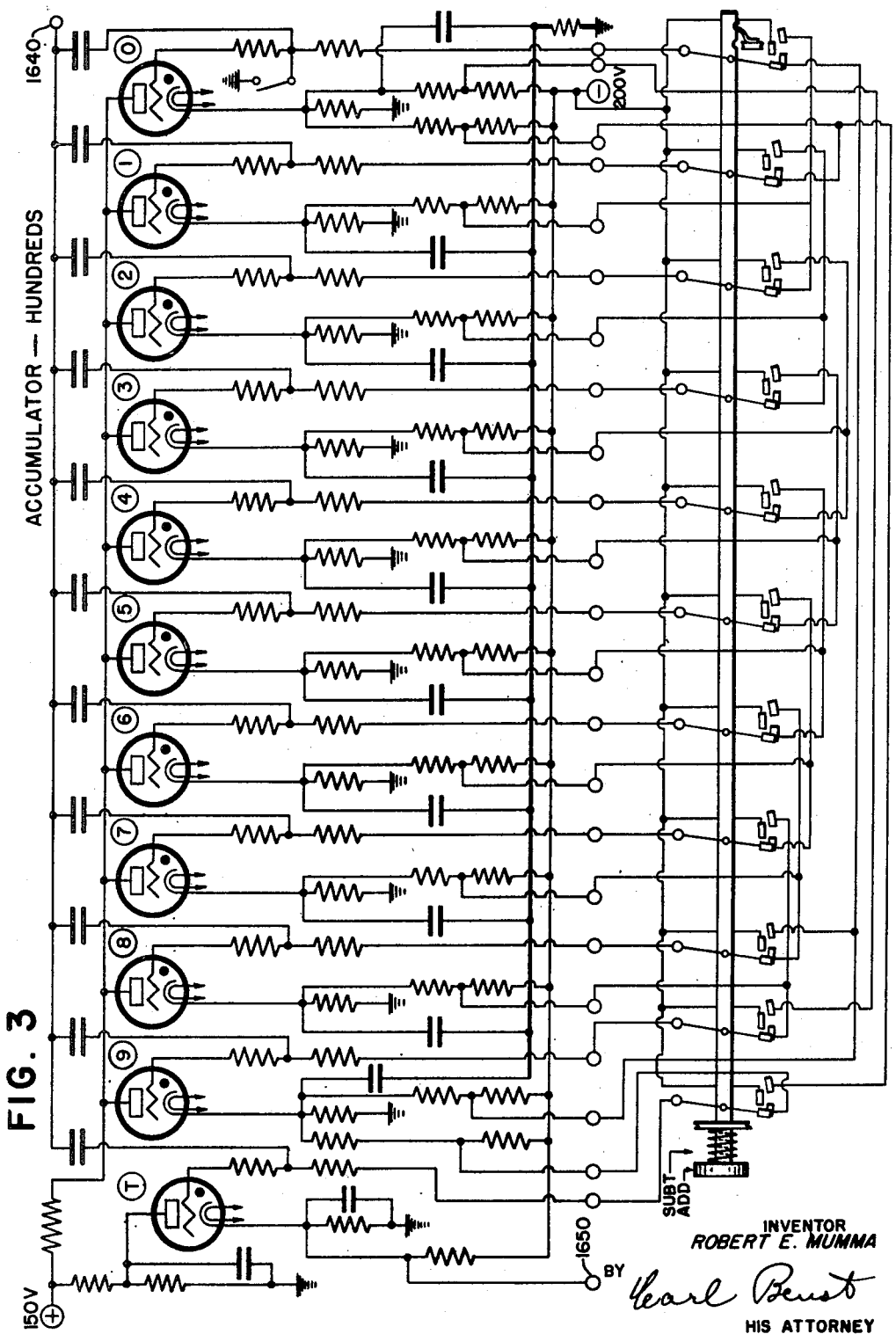
Figure 4:
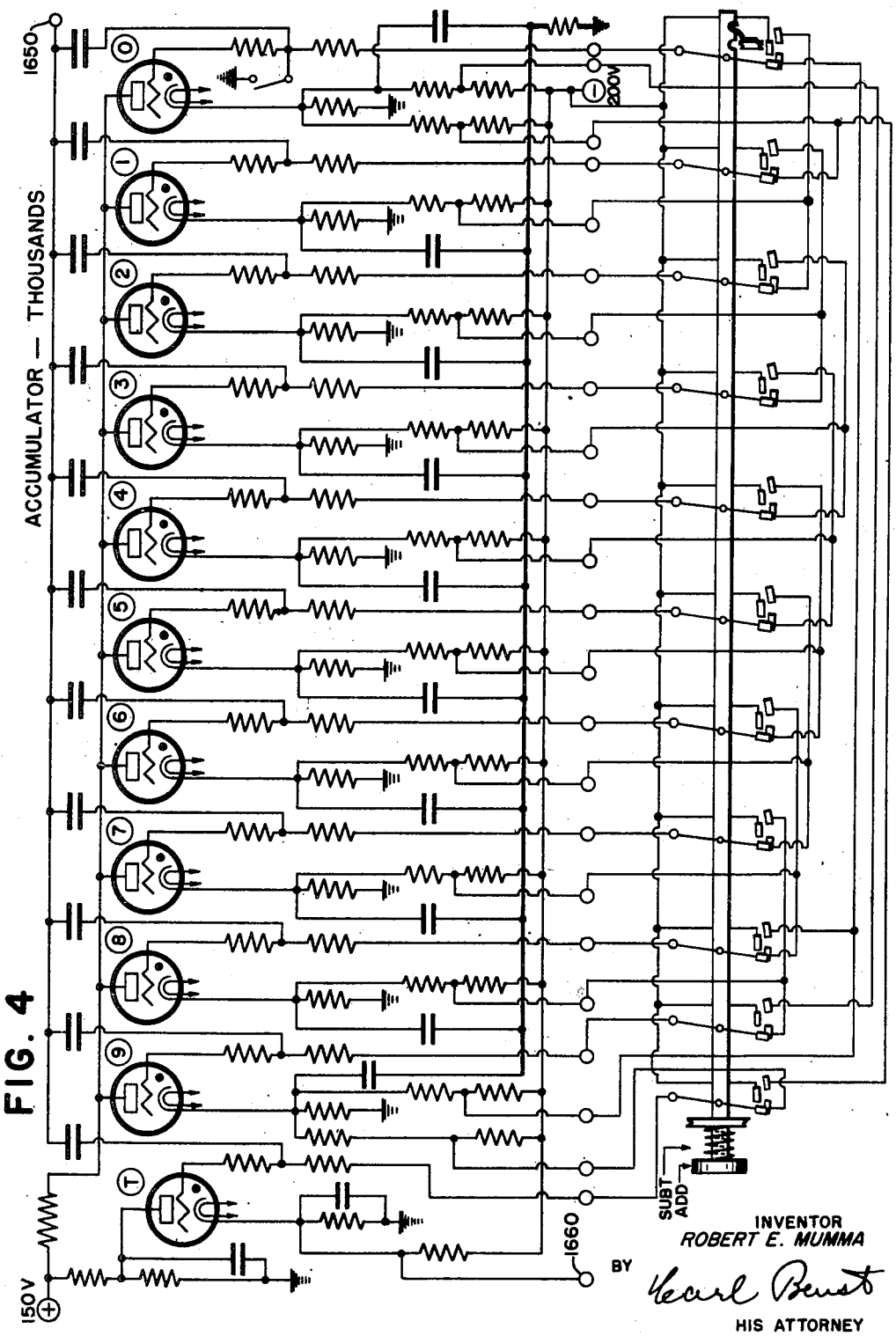
Figure 5:
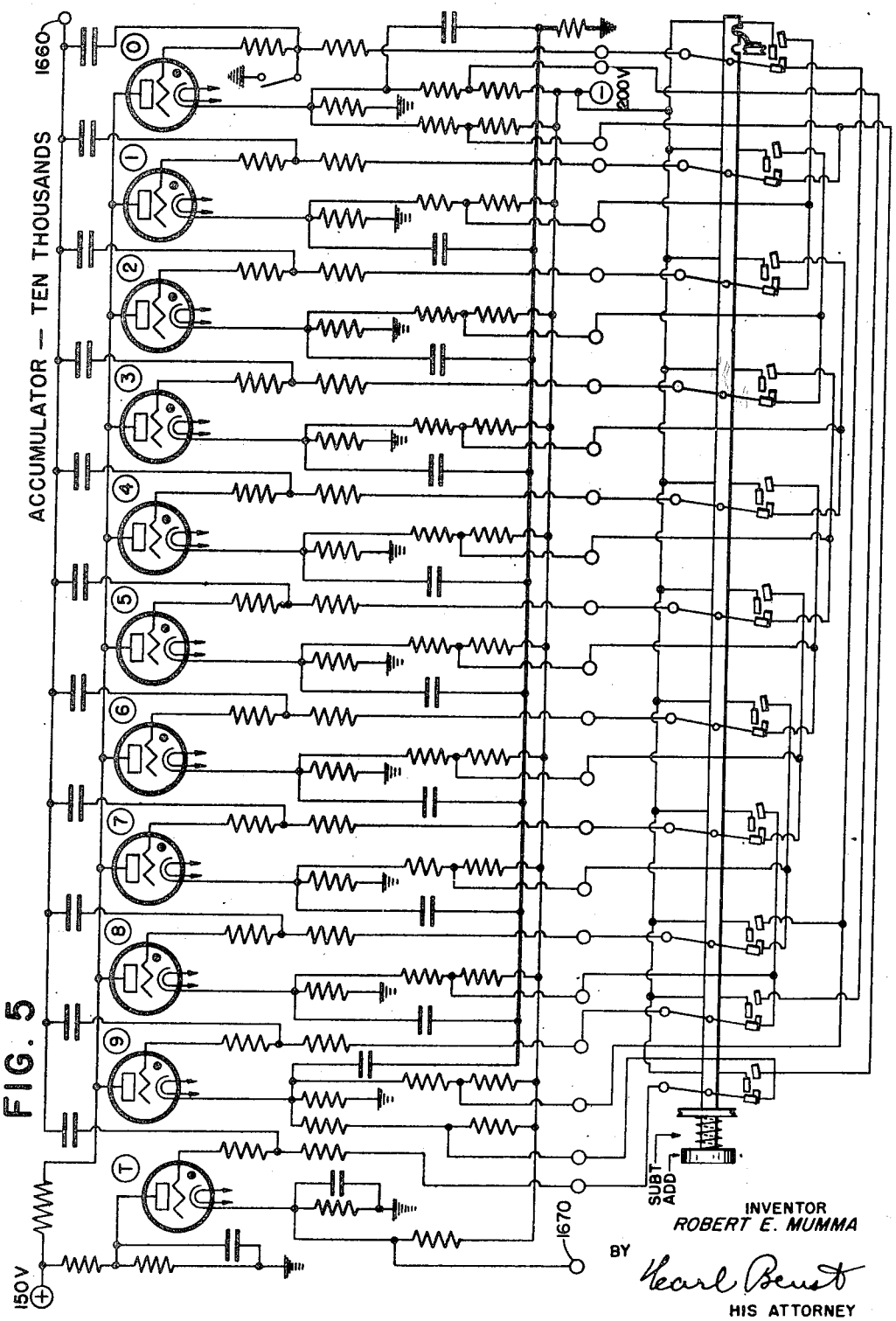
Figure 6:
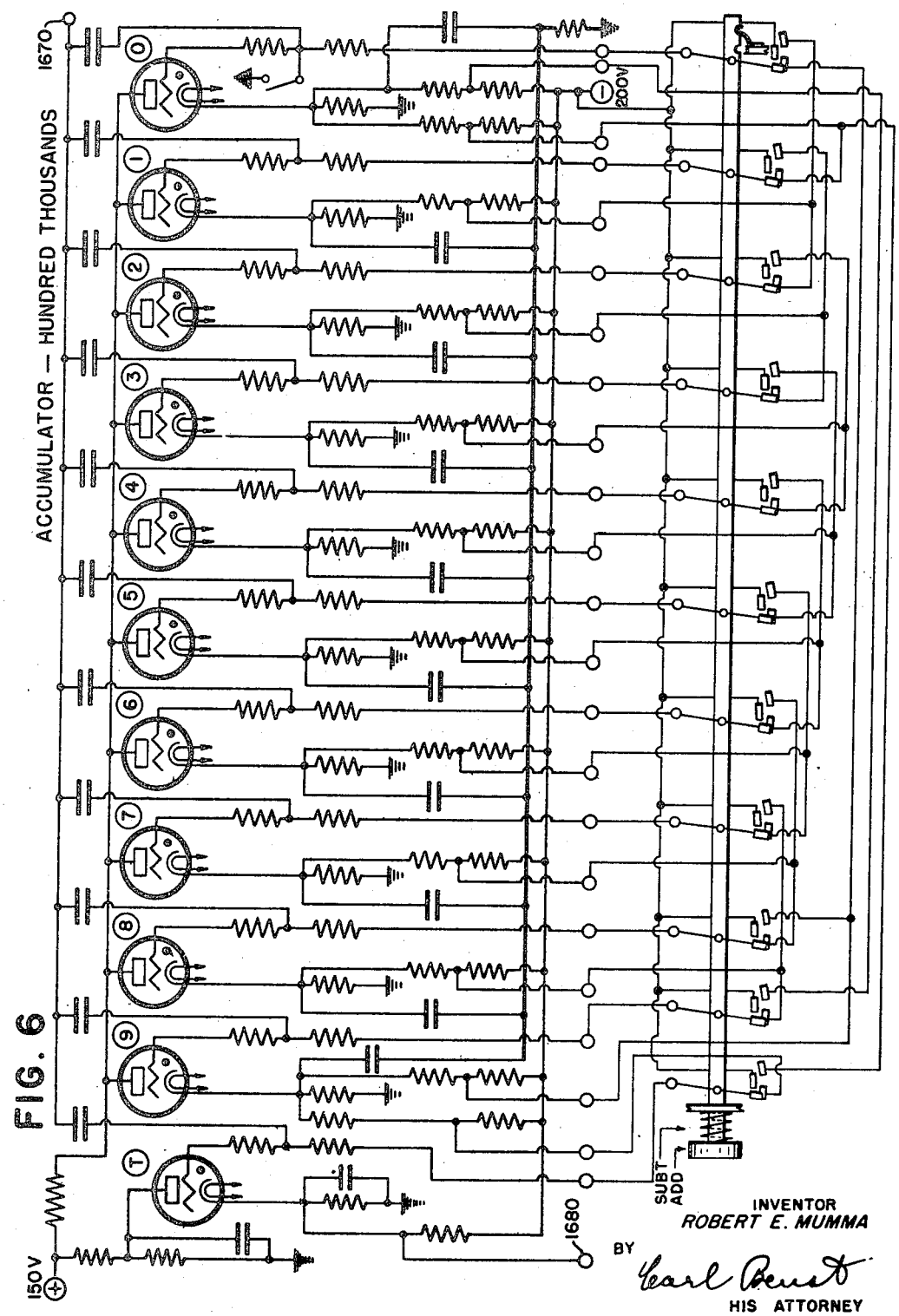

A special load is applied to point 2340 by negative 170-volt terminal 2360 through resistor 2370 of 230,000 ohms, in order to apply to the input of the units bank of the accumulator the same load as is applied to the input of the higher banks of the accumulator by reason of the input terminal of each bank being tied to the cathode supply network of the transfer tube of the next lower denomination, as illustrated by terminals 1436 and 1630 (Figs. 1 and 2) being connected to point 1270a (Fig. 1).

*Tally unit for controlling number of impulse generator cycles in each of the selected stages*

There has been described, heretofore, the impulse generator including the impulse generator operation initiating input terminal 84 (Figs. 16 and 22) and operation initiating input terminal 88 (Figs. 18 and 22) for initiating multiple-cycle calculating operations and single-cycle calculating operations, respectively. Such initiating impulses originate in the tally counting unit shown in Figs. 9, 10, 11, and 12, as controlled by the stage control circuits of Fig. 20, and are relayed by the circuits of Fig. 22 to the selected one of terminals 88 and 84.

Referring to Fig. 22, gaseous triode electron tube 200 relays recycling impulses from the tally unit impulse generator (Figs. 9–12) to the thousands bank of the impulse generator. The cathode of tube 200 is connected by conductor 201 to terminal 84 (see also Fig. 16), and, each time tube 200 fires, terminal 84 is given a positive potential impulse. Gaseous triode electron tube 202 relays recycling impulses from the tally unit impulse producer to the hundred thousands bank of the impulse generator. The cathode of tube 202 is connected by conductor 203 to terminal 88 (see also Fig. 18), and, each time tube 202 fires, terminal 88 is given an impulse.

Tube 200 is self-extinguishing and is supplied with 85 volts anode potential by source terminal 204, through resistor 205 of 10,000 ohms and resistor 206 of 1,000 ohms. Point 207 is coupled to ground through resistor 208 of 25,000 ohms in parallel with capacitor 209 of .05 microfarad. The cathode is grounded through resistor 210 of 75,000 ohms in parallel with capacitor 211 of .00015 microfarad. The grid is connected to biasing point 212 through resistor 213 of 50,000 ohms and resistor 214 of 500,000 ohms. Point 212 normally is given a controlling bias potential of about 20 volts negative by being connected to ground on one side by resistor 215 of 40,000 ohms, conductor 216, switch 217, and switch 218, and connected on the other side to a negative 170-volt source through a resistor 219 of 300,000 ohms. Tube 202 has anode and cathode potential supply circuits similar to tube 200 except that, normally, point 220 is connected to the ground 223 through a resistor 222 of 400,000 ohms, making the normal controlling bias of its grid over 100 volts negative. Therefore, with neither key 225 nor 226 operated, an impulse of approximately 30 volts positive impressed on the grids of tubes 200 and 202 from point 224, through capacitors 244 and 243, will fire only the tube 200 and relay the impulse through terminal 84, initiating the operation of a cycle of the impulse generator at the thousands bank. However, if either "add" key 225 or "subtract" key 226 is operated, the connection of the point 212 to ground 221 is broken, which is supplanted by connection to ground 227 through resistor 228 of 400,000 ohms, preventing tube 200 from firing on a 30-volt positive signal. On the other hand, point 220 is connected to ground 221, rendering tube 202 responsive to a 30-volt positive signal from point 224, which relays a cycling impulse to the hundred thousands order of the impulse generator instead of to the thousands order. In this manner, the type of calculating operation determines the starting point in the impulse generator for a cycle of operation thereof. It is to be noted, as has been said, that "subtract" key 226 may be utilized to mechanically control all the accumulator key switches corresponding to key switch 1430 (Fig. 1) to prepare the accumulator counting ring for reverse operation.

Gaseous triode electron tubes 230, 231, 232, and 233 are relays, respectively, for the impulses produced by the thousands, hundreds, tens, and units banks of the tally impulse unit shown in Figs. 9, 10, 11, and 12. As any one of these tubes 230 to 233 fires, a rise in cathode potential ensues, sending a positive impulse on common cathode conductor 234 to fire either tube 202 or 200, whichever is selected. The relay tubes 230 to 233 are self-extinguishing. All the anodes receive a potential from a common 85-volt positive source terminal 235 through resistor 236 of 7,500 ohms, point 237, and resistor 238 of 1,500 ohms. Point 237 is coupled to ground by resistor 239 of 15,000 ohms in parallel with capacitor 240 of .01 microfarad. The cathodes of tubes 230, 231, 232, and 233 receive their potential from conductor 234, connected to ground through resistor 241 of 50,000 ohms in parallel with capacitor 242 of .001 microfarad. Output point 224 is coupled electrostatically to the grids of tubes 202 and 200 by capacitors 243 and 244, each of .00005 microfarad. The grids of tubes 230—233 are each connected through a resistor like resistor 245 of 50,000 ohms, a point like point 246, and a resistor like resistor 247 to conductor 248, which is given a controlling potential of about 14 volts negative, being connected through resistor 249 of 15,000 ohms to ground and being connected through resistor 250 of 200,000 ohms to negative 200-volt source terminal 251.

Figure 12:
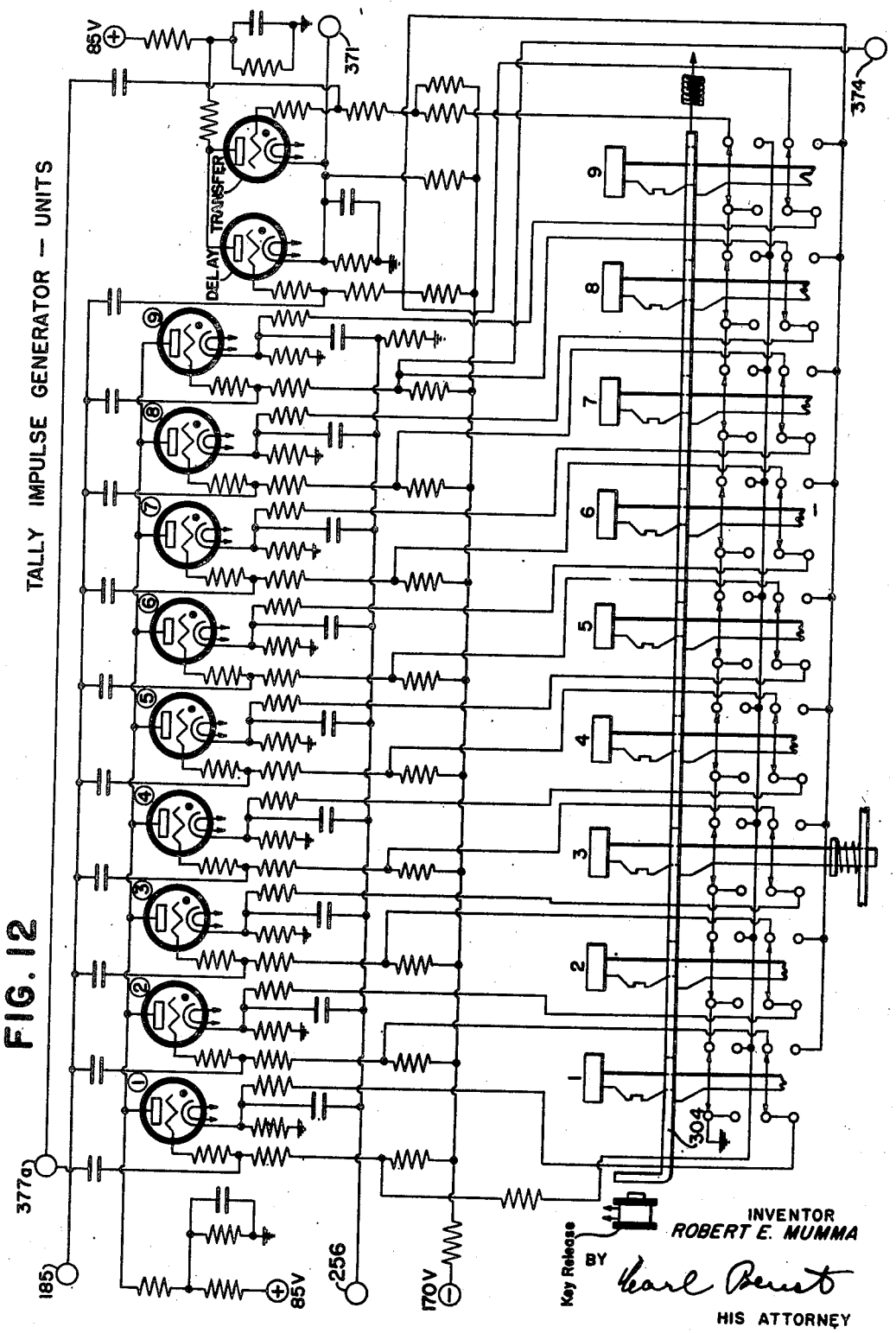

Each grid point like point 246 is coupled through a capacitor of .0001 microfarad, like capacitor 252, to a terminal like terminal 253. Terminal 253 is connected to the output conductor of the thousands bank of the tally impulse generator (Fig. 9), terminal 254 is connected to the output conductor of the hundreds bank (Fig. 10), terminal 255 is connected to the output conductor of the tens bank (Fig. 11), and terminal 256 is connected to the output conductor of the units bank (Fig. 12). These terminals, when given a positive impulse, will fire the associated one of relay tubes 230—233 and impress a positive impulse on conductor 234. After each relay tube fires, it will be self-extinguished because of the circuit elements described, in the same manner as the other self-extinguishing tubes heretofore described.

*Circuits controlling the stages of a calculating operation*

Figure 19:
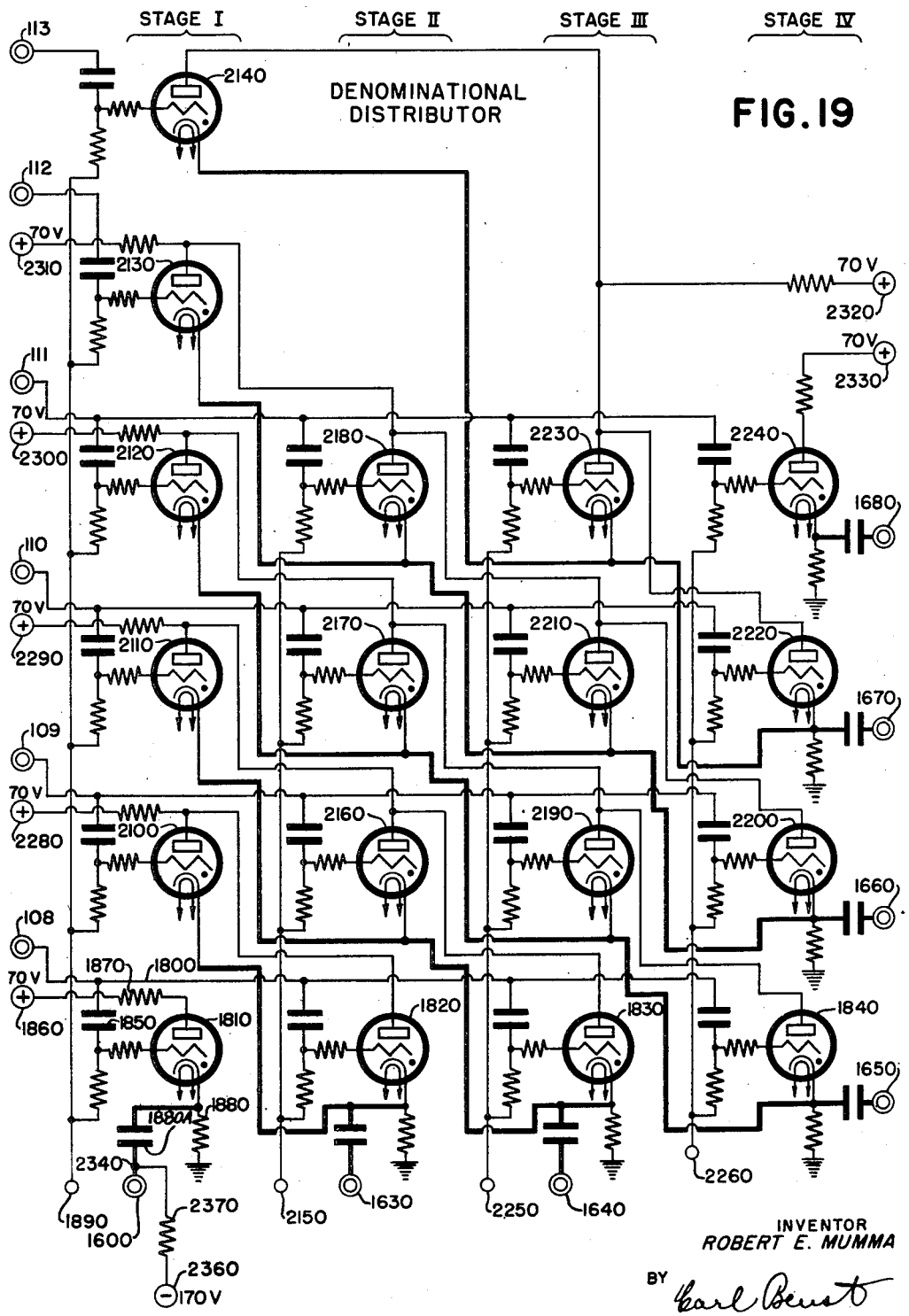
Fig. 19 shows the denominational distributor unit.
Figure 20:
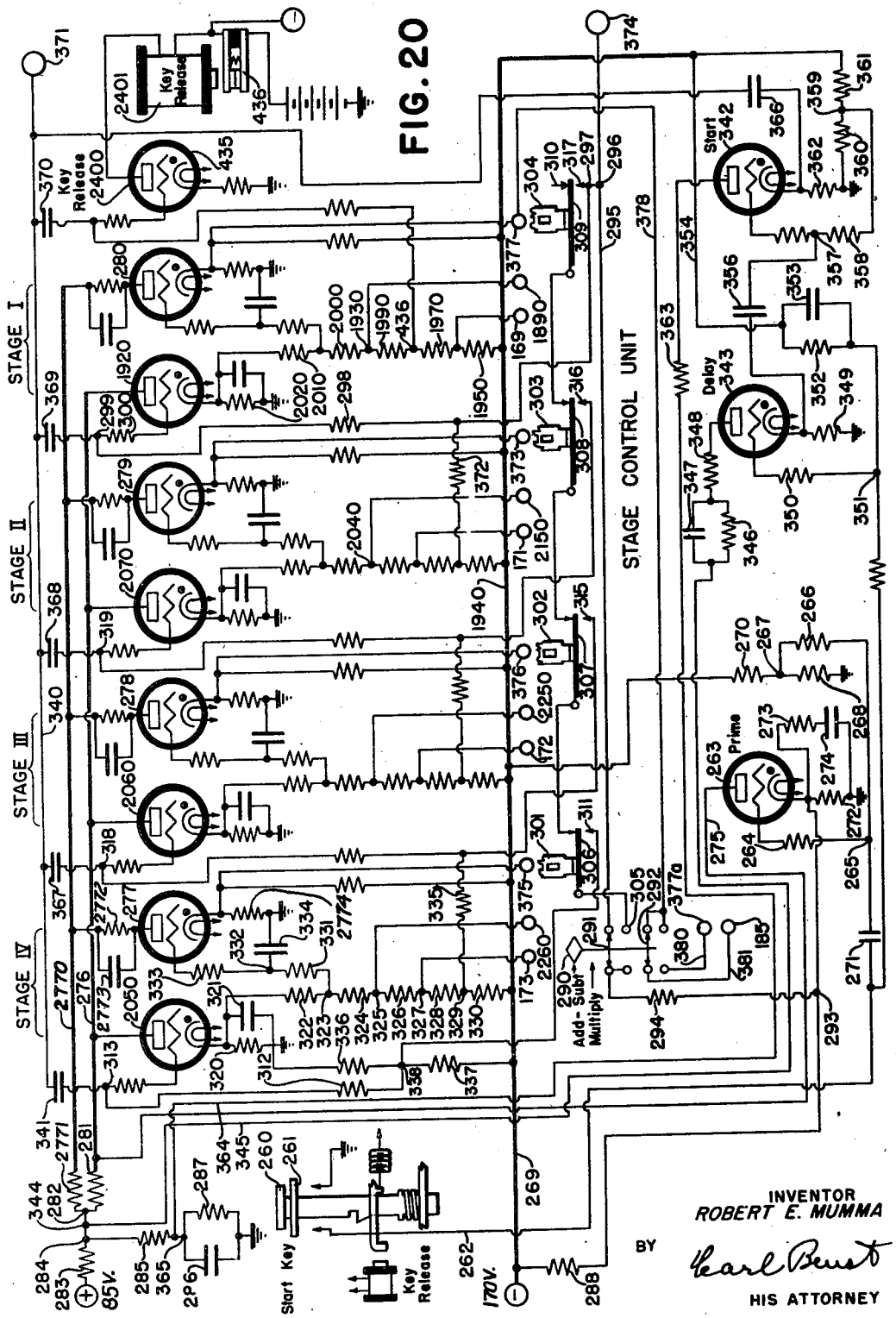
Fig. 20 shows the circuit for controlling the stages of a calculation, the key release circuit, and the power cut-off circuit.

Referring to Fig. 20, there is shown a plurality of pairs of gaseous electron tubes, one of each pair controlling an associated stage priming group of the denominational distributor shown in Fig. 19, and the other tube of each pair controlling the corresponding stage of the tally unit impulse generator shown in Figs. 9, 10, 11, and 12.

The stages of a calculating operation will be designated I, II, III, and IV, stage I being that in which a selected multiplicand as set up by the keys of the impulse generator is entered into the accumulator as though multiplied by the units denomination of the selected multiplier as set up on the keys of the tally unit impulse generator, to be described. Addition or subtraction is performed as a multiplication by one, the substraction operation requiring the accumulator to be conditioned to operate in the reverse manner, as has been described, and therefore addition or subtraction is a stage I calculation.

A start key 260 Fig. 20), when operated, closes switch 261 to ground the conductor 262. A priming electron tube 263 of the gaseous triode type is fired by having the potential of its grid, normally maintained at about 40 volts negative by being connected through 50,000-ohm resistor 264, point 265, resistor 266 of 500,000 ohms to point 267, which point is connected to ground through resistor 268 of 60,000 ohms and to negative 170-volt supply conductor 269 through resistor 270 of 200,000 ohms, raised to the firing point by reason of its grid bias point 265 being coupled to said conductor 262 through capacitor 271 of .00025 microfarad. The cathode of priming tube 263 is grounded on one side through a resistor 272 of 75,000 ohms in parallel with a resistor 273 of 5,000 ohms in series with capacitor 274 of .001 microfarad, and is connected on the other side to the negative 170-volt conductor 269 through resistor 288 of 375,000 ohms. The anode is supplied with potential by being connected by conductor 275 to conductor 276, serving the tubes 2050, 2060, 2070, and 1920 with anode potential. Conductor 276 is connected through resistor 281 of 22,500 ohms, point 282, and resistor 283 of 100 ohms to an 85-volt positive source of potential. Point 284 is grounded through resistor 285 of 7,500 ohms and capacitor 286 of .01 microfarad in parallel with resistor 287 of 15,000 ohms. Under these circumstances, when the "start" key switch is closed, the priming tube 263 will fire and become conducting, the capacitor 274 will charge, and the potential of the cathode of tube 263 will thereafter rise. That rise in cathode potential is used for priming the grid of a selected one of the tubes 2050, 2060, 2070, and 1920. In the adding position of switch 291 the tube 1920 is primed. In the multiplying position of switch 291 that one of tubes 2050, 2060, 2070, and 1920 as determined by detent operated switches 306—309, is primed. The circuits for such priming will be traced in what follows. The common anode supply conductor 276 for the priming tube 263, and tubes 2050, 2060, 2070, and 1920, will receive a drop in potential as any of the tubes 2050, 2060, 2070, and 1920 fire and become conducting, because these last-mentioned tubes have their cathodes coupled electrostatically to ground, and, while the cathode-ground capacitor is charging on commencement of conduction in the associated tube, the potential of conductor 276 drops momentarily to within about 15 volts of ground. At this time, the priming tube's cathode potential is far above ground by reason of its cathode-ground capacitor having been charged, and the ensuing dip of its anode potential causes a momentary cessation of anode-cathode potential, and the priming tube 263 is extinguished, the grid having resumed its normal controlling bias. Therefore the priming tube conducts and primes until the first one of tubes 2050, 2060, 2070, and 1920 becomes conducting.

The add-subtract and multiplying key 290 is provided with two switches 291 and 292. Switches 291 and 292 on the upper contacts prepare the tally impulse producing device for an adding or subtracting operation and on the lower contacts prepare that device for a multiplying operation.

In an adding operation, the cathode of the priming tube 263 is connected through point 293, resistor 294 of 500,000 ohms, switch 291, in upper position, conductor 295, points 296 and 297, resistor 298 of 500,000 ohms, point 299, and resistor 300 of 50,000 ohms to the grid of tube 1920, priming it, as tube 263 conducts. Terminal 374 (see also Fig. 12) connected to point 296 also primes the "9" tube of the units bank of the tally impulse generator, which "9" tube will thereafter be fired by the firing of tube 280 (Fig. 20), causing a potential rise on terminal 185, as will be explained more in detail.

In multiplying operations, that one of tubes 2050, 2060, 2070, and 1920 to be primed depends on what multiplier is set up on the keys of the tally impulse generator (Figs. 9, 10, 11, and 12), switching being provided so as to prime that stage control tube of the unit of Fig. 20 which is associated with the highest denomination of the selected multiplier number. Thus, if the multiplier is "5670," stage IV is primed; if the multiplier is "672," stage III is primed; if the multiplier is "54," stage II is primed; and if the multiplied is "8," stage I is primed. The operation of a key in a bank of the tally impulse generator (Figs. 9, 10, 11, and 12) moves an associated detent bar, that for the thousands bank being 301 (Figs. 9 and 20), that for the hundreds bank being 302 (Figs. 10 and 20), that for the tens bank being 303 (Figs. 11 and 20), and that for the units bank being 304 (Figs. 12 and 20). The potential of switch point 305 (Fig. 20) is normally carried through detent bar operated switches 306, 307, 308, and 309 to dead contact 310. The highest denominational key of the tally impulse generator that is operated in a given calculation moves the associated detent bar, switching the connection of point 305 to the associated stage tube. Thus, if a thousands bank key is operated in the tally impulse generator unit (Fig. 9), switch 306 (Fig. 20) will be moved by detent bar 301 to contact 311, connected through resistor 312 of 500,000 ohms to the grid bias point 313 of tube 2050, representing stage IV of a calculating operation. The effect of movement of detent bars 302, 303, and 304 similarly makes contact with switch points 315, 316, and 317, leading, respectively, to the grid bias points 318, 319, and 299, respectively, of tubes 2060, 2070, and 1920. It is apparent that the highest denominational switch of switches 306, 307, 308, and 309 that is operated carries the potential of point 305 to its associated tube to the exclusion of the lower stage tubes. Thus, with the key 290 set to multiplying position, tube 263, upon firing, primes the stage tube associated with the highest significant multiplier digit.

The cathode of each of stage control tubes 2050, 2060, and 2070 is given its potential supply by being connected to ground on one side through a resistor of 25,000 ohms, like resistor 320 in parallel with a capacitor of .002 microfarad, like capacitor 321, and on the other side to negative 170-volt conductor 269 through a resistance of 15,000 ohms, like resistor 322, a point like point 323, a resistor of 7,000 ohms, like resistor 324, a point like point 325, a resistor of 15,000 ohms, like resistor 326, a point like point 327, a resistor of 2,500 ohms like resistor 328, a point like point 329, and a resistor of 50,000 ohms like resistor 330. The cathode supply of tube 1920 is slightly different and has previously been considered in connection with the priming action of terminal 1890 (see also Fig. 20). The difference in the arrangements of resistors in the cathode supply of tube 1920, as compared to the tubes 2050, 2060, and 2070 relates to its priming action on the key release tube 2400 as well as its firing effect upon its companion tube 280.

Figure 9:
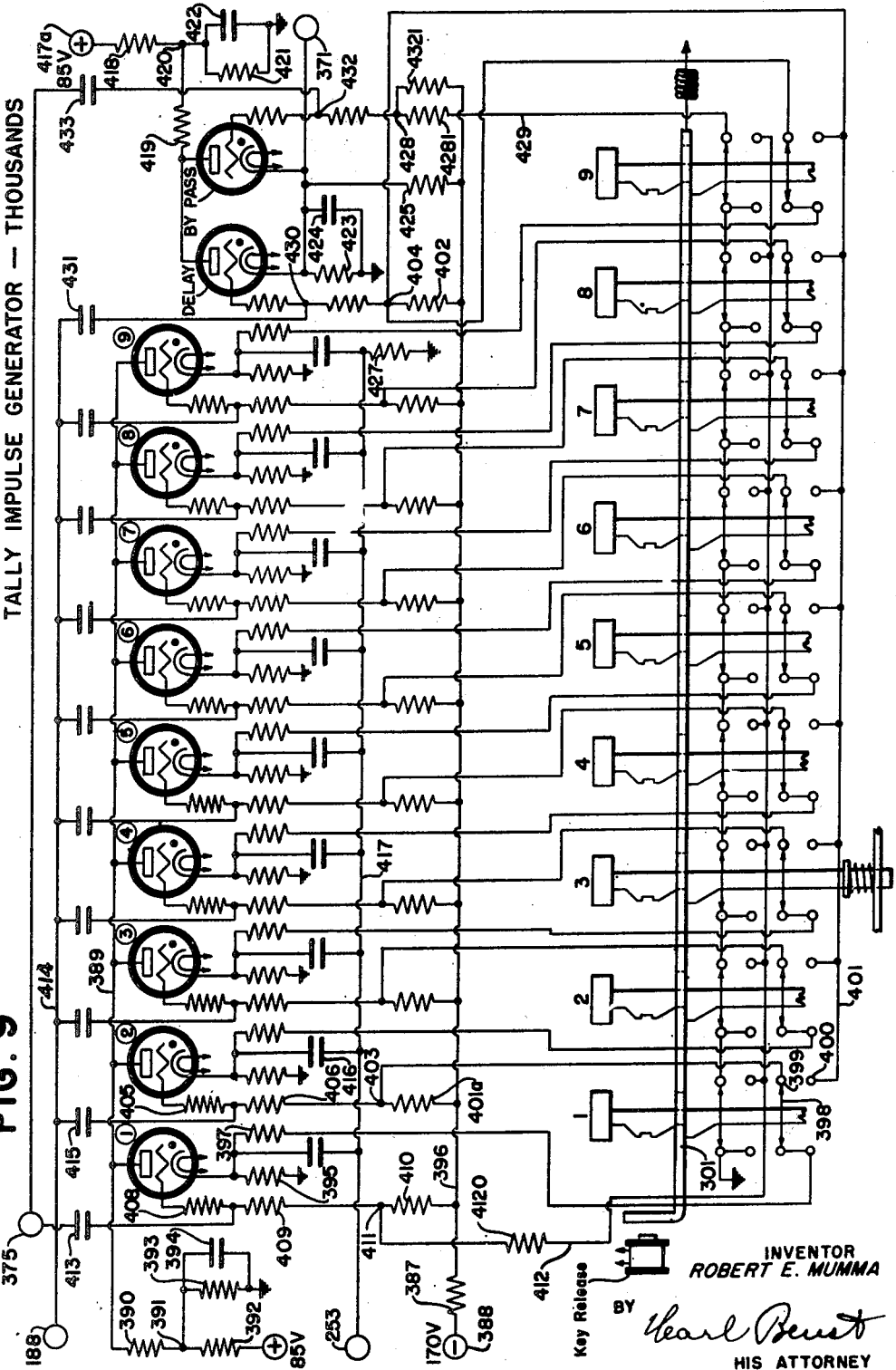

The resistances leading from the cathode of a stage control tube—for instance, tube 2050—to the negative 170-volt conductor 269 form a multiple potential divider. At point 323, a connection is made through a resistance of 100,000 ohms, like resistor 331, a point, like point 332, and a resistance of 50,000 ohms, like resistor 333, to the grid of the companion tube 277 of the pair constituting stage IV. Conduction in tube 2050 raises the normal controlling potential bias of tube 277 to fire it after the charging of grounded delay capacitor 334 of .005 microfarad. Point 325 is given a lesser potential rise as tube 2050 commences conduction, which is conveyed by terminal 2260 (see also Fig. 19) to prime stage IV of the denominational distributor unit. Point 327 is given a slightly lesser potential rise as tube 2050 commences conduction, which is conveyed by terminal 173 (see also Fig. 21) to prime tube 153, which relays stepping impulses from the impulse generator to the thousands, or stage IV, bank of the tally unit impulse generator (Fig. 9). Point 329, given a slightly lesser rise in potential, is connected through a 150,000-ohm resistor, like resistor 335, to prime the grid bias point 318 of tube 2060, representing stage III of a calculating operation. Thus, the stage control tube 2050, when conducting, primes the stage control tube 2060, just as priming tube 263 primes the stage control tube 2050 in calculations involving stage IV.

The change in potential of the cathode of tube 2050 is from about 38 volts negative in the nonconducting state to about 35 volts positive in the conducting state. The resistances in the potential divider circuit connecting the cathode to the negative 170-volt conductor have been chosen so as to prime or fire the associated controlled tubes as the operation demands.

The grid bias of stage control tube 2050 is normally adjusted by a potential divider consisting of resistors 336 and 337, connected between ground and the negative 170-volt supply conductor 269, to about 75 volts negative, point 338 being connected through resistor 312 of 500,000 ohms to the bias point 313. Priming potential impressed on point 338 from the cathode of the priming tube 263 makes the grid of tube 2050 more positive to bring it to about several volts more negative than the firing point. Thus, a small positive impulse on input conductor 340, impressed through a capacitor, like capacitor 341 of .00005 microfarad, onto the grid, will fire the tube 2050 to the exclusion of the other of stage tubes 2060, 2070, and 1920, if detent bar 301 has been moved by a key having been operated in the thousands bank of the tally unit impulse generator. Similarly, if detent bar 302 of the hundreds tally denominational order is the highest stage selected, tube 2060 will be the first to fire, and tubes 2050, and 277 will not fire in that calculating operation. The same is true with stage II and stage I, as is obvious. On adding operations, stages IV, III, and II are cut out entirely, the priming tube 263, as has been stated, priming the tube 1920 associated with stage I even though no key has been operated in the units bank of the tally unit.

The starting impulse is generated by gaseous triode tube 342, which is fired by delay tube 343 of the same type, which tube 343 is fired also by the closing of starting switch 261. Delay tube 343 is supplied with anode potential by being connected to point 344 by conductor 345, resistor 346 of 200,000 ohms in parallel with capacitor 347 of .002 microfarad and resistor 348 of 10,000 ohms. The cathode of tube 343 receives its potential by being grounded through resistor 349 of 25,000 ohms. The grid of tube 343 receives a normal controlling bias potential through resistor 350 of 500,000 ohms, point 351, resistor 352 of 400,000 ohms in parallel with capacitor 353 of .01 microfarad, and conductor 354 which is connected to the negative 170-volt conductor 269. On the closing of switch 261, tube 343 fires and becomes conducting after capacitor 353 charges, and, in so doing, the cathode rises in potential from ground to about 45 volts positive as capacitor 347 charges, which 45-volt rise in potential is impressed through capacitor 356 of .00005 microfarad onto grid bias point 357 of "Start" tube 342, normally at a controlling potential of 16 volts negative, by being connected through resistor 358 of 300,000 ohms to point 359, which is connected to ground through resistor 360 of 40,000 ohms and to the negative 170-volt conductor 269 through resistor 361 of 400,000 ohms.

The cathode of "start" tube 342 is grounded through a 50,000-ohm resistor 362, and the anode is connected through resistor 363 of 1,500 ohms and conductor 364 to point 365, connected to the 85-volt positive terminal on one side through resistors 285 and 283, before mentioned, and to ground through resistor 287 and capacitor 286, before mentioned.

As starting tube 342 fires and becomes conducting, a positive potential impulse is impressed through a capacitor 366, of .01 microfarad, onto input conductor 340, so that approximately a 25-volt signal is impressed through all the capacitors 341, 367, 368, 369, and 370, firing the primed one of tubes 2050, 2060, 2070, and 1920. The key release tube, connected to input conductor 340, is never fired by the start tube, as it is never primed at the time the start tube fires, but it is fired by an impulse from terminal 371 emanating from the units bank of the tally impulse generator unit after tube 1920 has become conducting. Impulses on conductor 340 fire any primed tube of the tubes 2050, 2060, 2070, 1920, and the "key release" tube 2400.

Suppose, for example, tube 2070 had been fired by the start tube 342, due to detent bar 303 having been moved, it being associated with the denomination of the highest significant digit selected on the tally keys, then the rise in its cathode potential will do the following things:

(a) Extinguish the "priming tube" 263, as has been explained;

(b) Fire the tube 279 paired with it as the stage II controls;

(c) Prime, through terminal 2150 (see also Fig. 19) the stage II denominational distributor tubes;

(d) Prime, through terminal 171 (see also Fig. 21), the stage II relay tube 151; and (e) Through conductor 372, prime the tube 1920 to be responsive, by firing on receiving an impulse on its grid, impressed on terminal 371 and conductor 340.

As the associated stage II tube 279 fires and becomes conducting, terminal 373 (see also Fig. 11) receives a positive potential impulse, which initiates operation in the tens bank of the tally impulse generator unit. In a similar manner, an impulse on terminal 375, when tube 277 fires (see also Fig. 9) initiates operation in the thousands bank or stage IV of the tally impulse generator unit; an impulse on terminal 376 (see also Fig. 10) when tube 278 fires initiates operation in the hundreds bank or stage III of the tally impulse generator unit; and an impulse on terminal 377 initiates operation in the units bank or stage I of the tally impulse generator unit.

Each of the tubes 277, 278, 279, and 280 obtains anode potential from conductor 2770, connected through resistor 2771 of 7,500 ohms and resistor 283 to the positive 85-volt terminal, the connection of each anode to conductor 2770 being made by a resistor, like resistor 2772, of 250,000 ohms, in parallel with a capacitor, like capacitor 2773, of .002 microfarad. Each cathode is grounded through a resistor, like resistor 2774 of 25,000 ohms. Consequently, as a tube, like tube 277, fires, the cathode rises sharply in potential while the anode capacitor is charging, which rise gradually subsides as the said capacitor charges and the large anode resistor comes into effect. The consequence is to cause an impulse at the cathode which is impressed momentarily on the associated output terminal, such as terminal 375 associated with tube 277.

Only in the multiplying position of key 290 (Fig. 20) is the cathode of tube 280 Fig. 20 connected to terminal 377a of Fig. 12 by way of conductor 378, switch 292 (in lower position), and conductor 380, for, when the switch 292 is in the upper or add-subtract position, the positive rise in potential of terminal 377 is impressed on conductor 381 and terminal 185 (see also Fig. 12), which is the input conductor for the units bank of the tally impulse generator for the digit tubes "2" to "9" and the delay tube, and hence it will fire the "9" tube, which, as explained, is primed then through terminal 374, causing but one cycle of the impulse generator, which is all that is wanted in adding or subtracting operations. After the "9" tube of the units order of the tally impulse unit (Fig. 12) is fired, the calculation is ended.

The transfer impulse from the units bank of the tally impulse generator, to be described, when received at terminal 371 and impressed through capacitor 370, fires a key release tube 2400, if it be primed because of conduction in tube 1920, which actuates all the key release solenoids of the tally unit and the impulse generator unit, restoring the keys, and temporarily opening an anode supply switch 436 serving all the tubes except those of the accumulator, which may be restored to zero condition by grounding all the zero tube grids in any convenient manner, as by switches like switch 438 (Fig. 1).

The key release solenoid 2401 and the power cutoff means 436 for the anode potential are shown conventionally.

*Tally unit recycling impulse generator*

Figs. 9, 10, 11 and 12 show the circuits constituting the tally unit impulse generator for issuing recycling impulses to the accumulator-actuating impulse generator of Figs. 13, 14, 15, 16, 17, and 18 and for stepping the stage control unit shown in Fig. 20.

From what has been said before, it will be understood that the accumulator-actuating impulse generator of Figs. 13, 14, 15, 16, 17, and 18 is caused in one cycle to issue in each selected denomination a selected number of impulses, which impulses are routed to certain denominational banks of the accumulator depending on the stage of calculation. The tally unit impulse generator determines the number of cycles in each of selected stages of a calculating operation. In addition and subtraction calculations, there is only one stage involved, stage I, and only one cycle is initiated in that stage. In multiplying operations, up to four stages may be involved and up to nine cycles in each stage may be selected, this being the disclosed multiplier capacity. The denominational distributor of Fig. 19, as has been shown, routes the impulses to the proper denominations of the accumulator under control of the stage control tubes 2050, 2060, 2070, and 1920 (Fig. 20). The tally unit impulse generator of Figs 9, 10, 11, and 12 is controlled stage by stage by the tubes 277, 278, 279, and 280 of Fig. 20, through terminals 375, 376, 373, and 377 (Figs. 9, 10, 11, and 20) to initiate the operation of the tally impulse generator banks, one at a time in multiplying operations. In addition or subtraction operations, tube 263 of Fig. 20 primes the "9" tube of Fig. 12 through terminal 374. The firing of one of the tubes 277, 278, 279, and 280 of Fig. 20 commences the operation of the associated bank of the tally impulse generator or causes it to be by-passed in the event no keys are operated therein.

In a complete multiplying operation wherein four denominational banks of the tally unit generator are used, the thousands bank (Fig. 9), or stage IV, functions first, followed by the hundreds bank (Fig. 10), or stage III, the tens bank (Fig. 11), or stage II, and the units bank (Fig. 12), or stage I. In multiplying operations wherein a bank of the tally unit of lower denomination than the highest bank in which a key is operated, has no key operated, that bank is by-passed on initiation of operation therein and issues no recycling impulses. As has been explained before, the tally unit impulse generator banks higher than the highest bank in which a key has been operated do not receive any initiating impulse and therefore do not function.

Operation of a key in the tally unit sets up certain conditions. For instance, the operation of the "1" key (Fig. 9) in the thousands bank causes movement of detent bar 301 (see also Fig. 20), preparing circuits resulting in the priming of tube 2050 (Fig. 20) when the start key 260 is operated. Referring again to Fig. 9, there are provided nine digit-representing gaseous triode electron tubes associated with respectively numbered keys. There are also provided a "delay" tube and a "by-pass" tube, the delay tube firing after the last digit tube fires. In case no digit key is depressed, the "by-pass" tube will fire immediately on initiation of operation of the bank.

The digit tubes receive anode potential from conductor 389, connected through resistor 390 of 5,000 ohms, point 391, and resistor 392 of 3,000 ohms to a positive 85-volt source of potential. Point 391 is connected to ground through resistor 393 of 20,000 ohms in parallel with capacitor 394 of .01 microfarad.

The anodes of the "delay" and "by-pass" tubes receive potential through a 1,500-ohm resistor 419 from point 420 connected on one side to an 85-volt source 417a through 40,000-ohm resistor 418 and connected on the other side to ground by 20,000-ohm resistor 421 in parallel with .01 microfarad capacitor 422.

The control grid of each tube is connected to the 170-volt negative conductor 396 through resistors, for example consider the "1" tube, like resistor 408 of 50,000 ohms, resistor 409 of 500,000 ohms, and resistor 410 of 100,000 ohms.

The cathode of each digit tube, tube "1" again being taken as an example, is connected on one side to ground through a 25,000-ohm resistor, like resistor 395, and on the other side to negative 170-volt supply conductor 396 through a resistor, like resistor 397, of 75,000 ohms, and a switch like switch 398, a point like point 400 (as the "1" key has been considered operated), conductor 401, point 404, and resistor 402 of 100,000 ohms. In the event the "1" key is not operated, the switch 398 contacts the point 399 and from there is connected through point 403 and through a 100,000-ohm resistor 401a to the said negative supply conductor 396. The cathodes of the other digit tubes have similar connections to conductor 396. Conductor 401 is connected to any of the digit key lower switches when in operated position. The cathodes of the "delay" and "by-pass" tubes are grounded on one side through a 60,000-ohm resistor 423 in parallel with a .01 microfarad capacitor 424, and on the other side are connected to the negative 170-volt conductor 396 through resistor 425 of 400,000 ohms. The "1" tube will become conducting first if any key in the bank is operated, as the "1" tube grid thereby is connected at point 411, by conductor 412, through 40,000-ohm resistor 412a with ground by the upper switch of any such operated key, relieving the normal controlling grid bias potential, so that tube "1" may be fired in response to a positive impulse of about 15 volts impressed on terminal 375. The ensuing rise in its cathode potential is impressed on the grid of the "delay" tube, as the "1" key is assumed operated, by way of conductor 401. If a key higher than "1" is operated, the rise in potential of the "1" cathode will be impressed on the grid of the "2" tube through switch 398 and contact 399. The grid of the "delay" tube is biased so that a cathode potential rise caused by the last selected digit tube conducting, which rise is transferred to it over conductor 401, will cause said "delay" tube to fire and become conducting on receipt of a positive impulse on its grid.

Therefore, in the event of a digit tube firing, the cathode rise in potential is transferred to the grid of the next higher selected digit tube to prime it or to the "delay" tube to fire it. Any digit tube so primed will fire in response to an input impulse. If no key in a bank is operated, all the digit tubes and the "delay" tube having a normal controlling bias applied to their grids will be held from firing. Considering digit tube "2" as typical of tubes "2," "3," "4," "5," "6," "7," "8," "9," and "delay," its grid is connected to point 403, which is normally at about 80 volts negative. The grid of the "1" digit tube is normally connected directly to the negative 170-volt conductor through resistor 408 of 50,000 ohms, resistor 409 of 500,000 ohms, and resistor 410 of 40,000 ohms. The grid of the "by-pass" tube has a normal potential that is controlling but which, being only about 48 volts negative with respect to ground or 27 volts negative with respect to the 21-volt negative cathode, loses control when a positive input impulse is received on input terminal 375. Point 428, normally connected to ground on one side through 40,000-ohm resistor 4231 and to the 170-volt negative conductor through resistor 4321 of 100,000 ohms on the other side, is disconnected from ground when a key of the bank is operated, and the grid of the "by-pass" tube receives the full 170-volt negative potential through said resistor 4321 of 100,000 ohms.

Thus, if a key is operated, the operation of the digit tubes of a bank of the tally unit impulse generator always begins with the "1" tube, no matter what digit key is depressed, and continues with the digit tubes in order until the tube associated with the operated key fires, and thereafter the "delay" tube fires. The grids of the digit tubes "2," "3," "4," "5," "6," "7," "8," and "9" and the "delay" tube are coupled to input conductor 414, each through a capacitor like capacitor 415 of .0001 microfarad. After initiation of the operation of a bank by the firing of the "1" tube by a positive impulse on terminal 375, then a positive impulse on terminal 188 (see also Fig. 21) will fire and render conducting the "2" tube in case a key higher than the "1" key has been operated, or the "delay" tube in the event only the "1" key has been operated. The operation of any key causes the switching of the cathode rise of its associated digit tube to the grid of the "delay" tube.

The cathode of each digit tube of a bank is coupled by a capacitor of .002 microfarad, like capacitor 416, to a common output conductor like conductor 417, grounded through a 100,000-ohm resistor like resistor 427. The thousands tally output terminal 253 (see also Fig. 22), is given a positive potential rise by the firing of an associated digit tube, causing relay tube 230 (Fig. 22) to become conducting, which initiates a recycling of the impulse generator as has been described. Thus, the impulse generator of Figs. 13 to 18 is recycled a number of times by a bank of the tally unit impulse generator determined by the value of the key operated in that bank. The circuits of Fig. 20, as has been disclosed, determine into what denominations of the accumulator the produced impulses are to be entered. For example, in stage IV of a multiplication operation, the thousands bank of the tally unit (Fig. 9) as controlled by the firing of tube 277 (Fig. 20) controls the number of recyclings of the impulse generator (Figs. 13 to 18), and the priming of stage IV terminal 2260 (Figs. 19 and 20) as controlled by the previous firing of tube 2050 (Fig. 20) determines the distribution of the impulses to the accumulator.

Grid point 430 of the "delay" tube (Fig. 9) is connected by capacitor 431 of .0001 microfarad to terminal 188, so as to be fired by the next impulse received on the terminal 188 from tube 153 (Fig. 21). The firing of the "delay" tube does not recycle the impulse generator, as its output is to terminal 371 (see also Fig. 20), which brings the next stage of the calculating operation into operating condition. If no key of the thousands bank (Fig. 9) is operated, the "by-pass" tube is primed and the "1" tube is unprimed and instead of the "1" tube firing, the "by-pass" tube fires on receipt of an impulse on terminal 375, its grid being coupled at point 432 and through capacitor 433 to input terminal 375, and as it fires it will impress an impulse on terminal 371 shifting the operation to the next stage. It will be obvious that the "by-pass" tube has no useful function in the thousands bank shown in Fig. 9 of the embodiment, as terminal 375 never receives an impulse if a key in the thousands bank is not operated. The "by-pass" tube is shown in Fig. 9 only to indicate that the tally unit banks, by being uniform, may be expanded to more than four stages.

The keys of the tally impulse unit are restored in the same manner as was disclosed in connection with the impulse generator; namely, by the firing of key release tube 2400 (Fig. 20).

Each time an impulse is received on terminal 371 (Fig. 20) which impulse is produced by the units bank of the tally unit impulse generator, the tube 2400 is fired as it is primed by reason of conduction in tube 1920.

*Operation*

As has been said, an adding or subtracting operation is accomplished by a single operation of the impulse generator performed in response to the impulse produced by the firing of the "9" tube in the units bank of the tally impulse producing unit (Fig. 12). If, for instance, the number 1087 is to be added, the following acts are performed— the "1" key in the thousands bank of the impulse generator (Fig. 16), the "8" key in the tens bank of the impulse generator (Fig. 14), and the "7" key in the units bank of the impulse generator (Fig. 13) are operated. The switches for controlling the direction of operation of the accumulator banks are set at "add" position as shown in the drawings (Fig. 1 to 8). The "add" key 225 (Fig. 22) is operated to condition tube 202. The switches 52 and 174 (Fig. 21) are closed. The add-subtract and multiplying key 290 (Fig. 20) is set in the position shown, and finally the "start" key 260 (Fig. 20) is operated. As the "start" key is operated, the tubes 263 and 343 fire, tube 263 priming stage I tube 1920 (Fig. 20) and the "9" tube in the units bank of the tally unit impulse generator (Fig. 12). The start tube 342 (Fig. 20) then fires and issues an impulse to fire stage I tube 1920, which primes the denominational distributor tubes 1810, 2100, 2110, 2120, 2130, and 2140 (Fig. 19), primes relay tube 150 (Fig. 21), and fires tube 280 (Fig. 20). The impulse issuing from tube 280 fires the "9" tube (Fig. 12), which issues an output impulse firing tube 233 (Fig. 22), which fires tube 202 to issue an impulse to the input conductor to the hundred thousands bank of the impulse generator (Fig. 18). As no keys were operated in the hundred thousands bank, the "delay" tube and the "T" tube fire in succession, the firing of the "T" tube sending an impulse to the ten thousands bank of the impulse generator (Fig. 17), in which no keys were operated, causing the "delay" tube and the "T" tube therein to fire in succession, the impulse generated by the "T" tube being sent to the thousands bank of the impulse generator (Fig. 16), in which the "1" key was operated. The "1" tube in the said thousands bank fires, sending an impulse which is impressed on the grids of the denominational distributor tubes 2120, 2180, 2230, and 2240 (Fig. 19), firing the primed tube 2120, which impresses an impulse on terminal 1650 (see also Fig. 4) to operate the thousands bank of the accumulator a step in an adding direction. If the adding operation is an initial entry, the zeroizing switches of the accumulator will have been previously temporarily closed to fire the zero tube in each bank. After the "1" tube in the thousands bank of the impulse generator (Fig. 16) has fired, the "delay" tube and the "T" tube will be fired in succession, the latter tube sending an impulse to the hundreds bank of the impulse generator (Fig. 15), in which no key has been operated, firing the "delay" tube and the "T" tube therein. The impulse generated by the "T" tube of the hundreds bank starts operation of the tens bank of the impulse generator (Fig. 14), in which the "8" key has been operated. The "1," "2," "3," "4," "5," "6," "7," and "8" tubes will fire in succession, impressing eight impulses on output terminal 109 (see also Fig. 19), which are impressed on the grids of denominational distributor tubes 2100, 2160, 2190, and 2200 (Fig. 19), firing the primed tube 2100 eight times in succession, generating eight impulses which are impressed on terminal 1630 (see also Fig. 2) to actuate the tens bank of the accumulator (Fig. 2) eight steps in an adding direction. The "delay" tube and the "T" tube (Fig. 14) will then fire in succession, the "T" tube sending an impulse to start the operation of the units bank of the impulse generator (Fig. 13) which has had the "7" key operated. The "1," "2," "3," "4," "5," "6," and "7" tubes therein will fire in succession, impressing seven impulses on terminal 108 (see also Fig. 19), which are impressed on the grids of denominational distributor tubes 1810, 1820, 1830, and 1840, firing the primed tube 1810 seven times in succession, generating seven impulses which are impressed on terminal 1600 (see Fig. 1 also) to actuate the units bank of the accumulator (Fig. 1) seven steps in an adding direction. The "delay" tube and the "T" tube of the units bank of the impulse generator then fire in succession, the firing of the "T" tube generating an impulse impressed on terminal 115 (see also Fig. 21), firing tubes 116, 122, and 123 (Fig. 21) in succession. Tube 116 extinguishes the "T" tube of the units bank of the impulse generator (Fig. 14), and tube 123 extinguishes the "T" tube of the tens bank of the impulse generator (Fig. 13) and impresses an impulse on conductor 134 (Fig. 21), which fires the primed tube 150, generating an impulse on terminal 185 (see also Fig. 12), which fires the delay tube of the units order of the tally impulse generator, generating an impulse on terminal 371 (see also Fig. 20), which fires the primed key release tube 2400, restoring the keys and momentarily interrupting the power supply by opening switch 436. The number 1087 has been added into the accumulator, and the calculating device is ready for another operation.

In a subtracting operation, the same operations are performed as in adding except the switch keys in the accumulator, like switch key 1430 (Fig. 1), are set to subtracting position, and the key 226 (Fig. 22) is operated instead of key 225 to perform this function for all banks of the accumulator.

Figure 10:
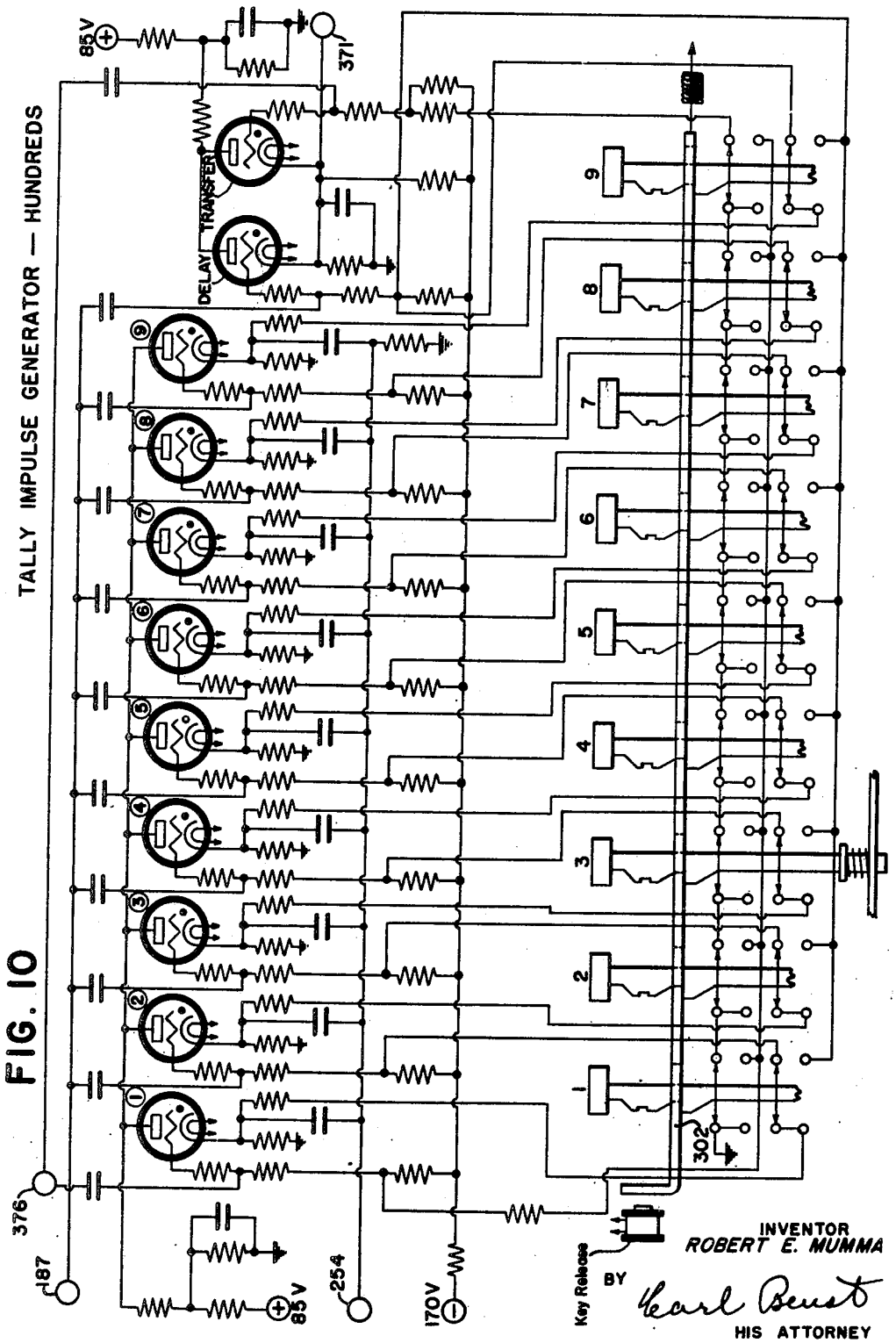
Figure 11:
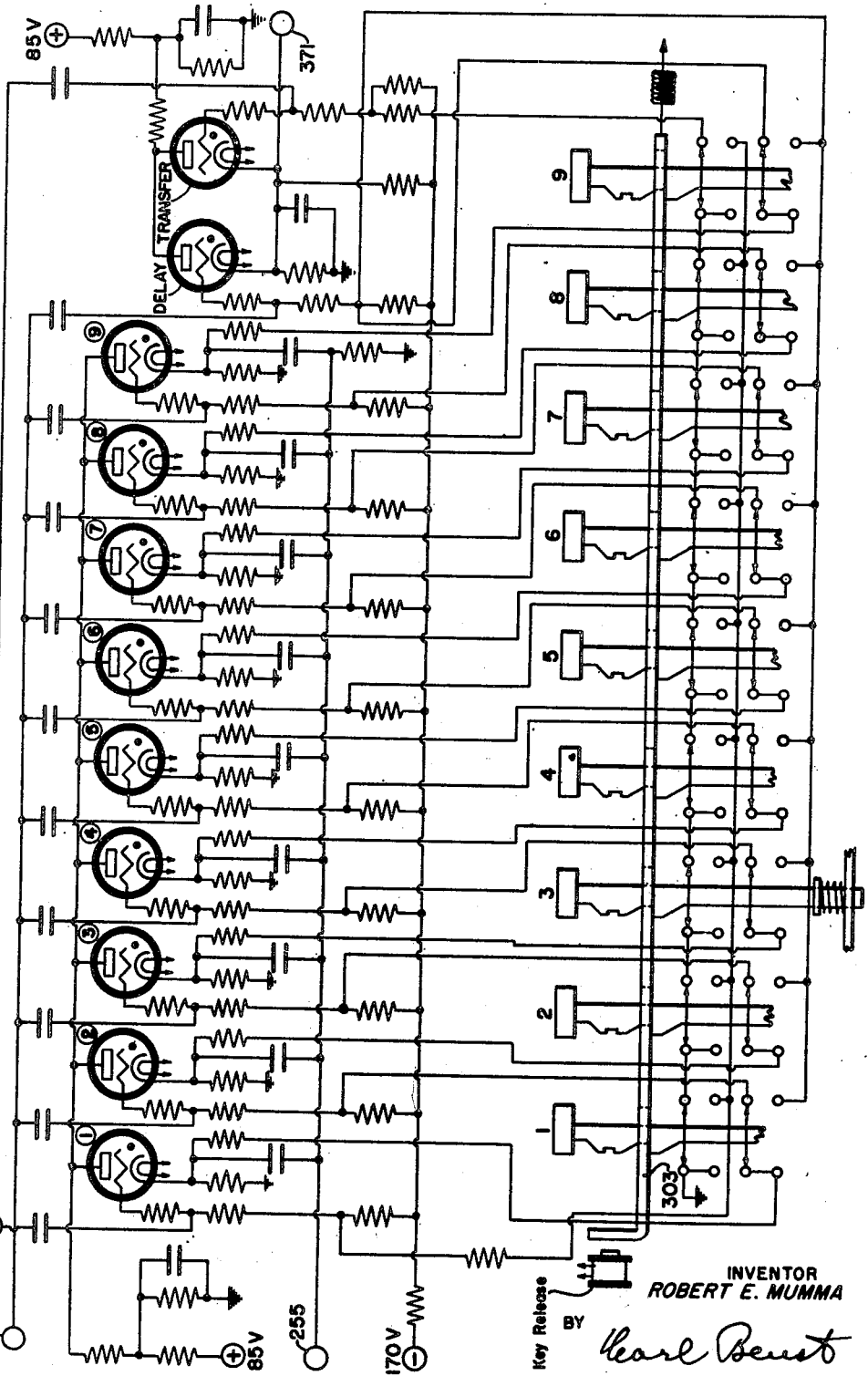

If the considered number 1087 is to be multiplied by another number such as 347, for example, the following operations are performed. The "3" key (Fig. 10), the "4" key (Fig. 11), and the "7" key (Fig. 12) in the tally impulse generator are operated. The same digit keys are operated in the impulse generator unit as were described in connection with the explanation of an adding operation. The "add" and "subtract" keys of Fig. 22 are left in the position shown. Switches 52 and 174 (Fig. 21) are closed, the key 290 (Fig. 20) is set to multiplying position, and start key 260 is operated. Tubes 263, 343, and 342 fire as in an adding operation. The firing of tube 263 primes stage III tube 2060, and the firing of tube 342 fires tube 2060, which in turn acts to fire tube 278, which in turn fires the "1" tube in the hundreds bank of the tally unit impulse generator (Fig. 10). The firing of tube 2060 has meanwhile primed denominational distributor stage III tubes 1830, 2190, 2210, and 2230 (Fig. 19), and has primed stage III relay tube 152 (Fig. 21). When the "1" tube (Fig. 10) fired, an impulse was generated and impressed on terminal 254 (see also Fig. 22) to fire stage III tube 231 (Fig. 22), which creates an impulse on conductor 234, which fires tube 200, creating an impulse at terminal 84 (see also Fig. 16) to commence an operation of the thousands bank of the impulse generator. One impulse is produced at terminal 111 (see also Fig. 19), which is impressed on tubes 2120, 2180, 2230, and 2240 of the denominational distributor (Fig. 19), firing the primed tube 2230 and creating an impulse on terminal 1670 (see also Fig. 6), actuating the hundred thousands bank of the accumulator (Fig. 6) one step. The hundreds bank of the impulse generator is by-passed. Next, eight impulses are impressed on terminal 109 (Figs. 14 and 19) by the firing of tubes "1," "2," "3," "4," "5," "6," "7" and "8" of the tens bank of the impulse generator (Fig. 14), which impulses are impressed on tubes 2100, 2160, 2190, and 2200 (Fig. 19), firing the primed tube 2190 eight times in succession, which creates eight impulses on terminal 1650 (see also Fig. 4), which actuates the thousands bank of the accumulator (Fig. 4) eight steps. The units bank of the impulse generator (Fig. 13) is actuated by the impulse produced by the "T" tube of Fig. 14, and the "1," "2," "3," "4," "5," "6," and "7" tubes therein fire in succession, creating seven impulses on terminal 108 (see also Fig. 19), which are impressed on tubes 1810, 1820, 1830, and 1840 (Fig. 19), firing primed tube 1830 seven times in succession, creating seven impulses on terminal 1640 (see also Fig. 3), actuating the hundreds bank of the accumulator (Fig. 3) seven steps. The "D" and "T" tubes of the units bank of the impulse generator (Fig. 13) then fire, the "T" tube causing tubes 116, 122, and 123 (Fig. 21) to fire in succession, extinguishing conducting tubes of the impulse generator, thus preparing it for another cycle of operation and sending an impulse on conductor 134 which fires the primed relay tube 152, creating an impulse on terminal 187 (see also Fig. 10) which fires the "2" tube (Fig. 10), which has been primed by the conducting "1" tube. The impulse created by the firing "2" tube is impressed on terminal 254 (see also Fig. 22), which fires tube 231, which in turn fires tube 200 to create a recycling impulse on terminal 84, which starts another cycle of the impulse generator exactly as the one just described. At the conclusion of the second cycle of the impulse generator, the impulse on conductor 134 (Fig. 21) is relayed through tube 152, and the ensuing impulse on terminal 187 (see also Fig. 10) causes tube "3" (Fig. 10) to fire. The impulse generator is recycled again, making the third entry of the number 1087 in the stage III of the multiplying operation. The impulse created on conductor 134 (Fig. 21) and relayed to terminal 187 (see also Fig. 10) fires the "delay" tube (Fig. 10), creating an impulse on terminal 371 (see also Fig. 20), which fires the primed stage II tube 2070, which in turn fires tube 279. The prime potential has been thus removed from tubes 2230, 2210, 2190, and 1830 (Fig. 19), and, instead, tubes 2180, 2170, 2160, and 1820 are primed. Tube 151 (Fig. 21) is now primed instead of tube 152. An impulse is produced on terminal 373 (Figs. 20 and 11), which starts operation of the tens bank of the tally unit impulse generator. Tubes "1," "2," "3," and "4" (Fig. 11) are fired in succession, tube "1" being fired by the impulse on terminal 373 and tubes "2," "3," and "4" being fired by impulses produced by tube 151 (Fig. 21) actuated once at the conclusion of each stage II cycle of the impulse generator. The number 1087 is therefore entered four times into the accumulator as routed by primed tubes 2180, 2170, 2160, and 1820 to complete the stage II of the multiplying operation, which entries are made in the next lower denominations of the accumulator as compared with stage III entries. When the "delay" tube of Fig. 11 fires after the "4" tube, stage I of the multiplying operation is commenced by the firing of tubes 1920 and 280 (Fig. 20), the units bank of the tally unit causing the impulse generator to cycle seven times, which enters the number 1087 seven times into the accumulator under control of primed denominational distributor stage I tubes 2120, 2110, 2100, and 1810. The firing of the "delay" tube of the units bank of the tally unit impulse generator fires the key release tube and completes the multiplying operation.

Typical means for indicating the data in the accumulator, apart from the glow of the gas in the conducting tube, may consist of a hunting type of rotary switch, as shown in the co-pending Desch and Mumma application for United States Letters Patent, Serial No. 325,040, filed March 20, 1940, which senses the condition of conduction in a tube by means of determining the potential of the various cathodes.

The claims of this application are drawn to a complete calculating machine. Divisional application Serial No. 761,813 contains claims to the counter or accumulator construction per se. Divisional application Serial No. 766,778 contains claims to an impulse generator and a cycle controller. Divisional application Serial No. 762,040 contains claims to an impulse routing switching system. Divisional application Serial No. 766,779 contains claims to a specific control circuit.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In combination, a plurality of output groups of relay electron tubes, each group having a common supply source of operating potential having circuit elements of such value that, when conduction commences in a tube, the conduction is, by reason of oscillatory phenomena, immediately extinguished; control circuits dividing the tubes into control groups which overlay said relay groups, the control circuits of a group being energizable to permit or prevent conduction in any tube of the group; a separate input circuit for each of input groups of the tubes, said input groups overlaying the output groups and control groups, each of which input circuits, when impressed with an electric impulse, tends to overcome the control energy on all the tubes of the associated input group and which actually does overcome the control over any tubes which are permitted to conduct; means to impress upon selected ones of the input circuits in sequence a selected number of electric impulses, each said sequential operation being performed over and over a selected number of times in each of certain control stages; means to energize one of said control circuits for each stage of sequential operation of the input circuits; and an output circuit for each output relay group, which circuit receives an output impulse when any tube associated therewith becomes conducting.

2. A plurality of gaseous electron tubes each having at least an anode, a cathode, and a control grid; means coupling said tubes into a plurality of groups, each group representing a denomination of a multiplicand; means coupling the tubes into product groups, the tubes of each of said product groups having a common anode-cathode supply circuit having circuit elements of resistance, capacitance, and induction of such value that, if conduction commences in a tube, it will be immediately self-extinguished due to oscillatory phenomena in the common supply circuit; means coupling the tubes into other groups representing stages of a multiplication calculation, each of said tubes in a stage group having a common normally controlling bias electric potential to prevent conduction in any of the associated tubes which normal bias potential of a group may be relieved to that just short of that necessary to permit the tube to conduct; an input circuit for each of the multiplicand groups, each of which circuits, when given an electric impulse, will affect the bias control of the associated tubes so that any such tube that has its stage control bias relieved will become conducting; means to impress a selected number of electric impulses on each of selected input circuits, said input circuits being given their input impulses in sequence; means to repeat said sequential operation of the impressing means a certain selected number of times for each of selected stages of a multiplying calculation; and means correlating the relieved stage control bias of the control groups and the stage operation of the multiplicand groups so that the same relative stages are acting together.

3. In combination, a denominational accumulator of numerical data actuable by electric impulses, each impulse representing a unit of data; an input means for each denomination to enter data directly into the denominations of the accumulator; one or more electronic relays coupled to each input means so that conduction in any relay impresses an electric impulse on the associated input means; means coupling the relays into control groups, there being a relay for each of a plurality of adjacent accumulator denominational input means in each group, the plurality of input means associated with a control means constituting those by which data is entered into the accumulator during a particular stage of a calculating operation, and all the control groups constituting all the stages of such calculating operation; means for energizing each control group coupling means in succession, the energization of a control means preparing the associated relays to function; a denominational impulse producer, each denomination having a plurality of electric impulse-producing digit-representing devices associated therewith equal in number to the digits of the denomination; an output means for each denomination of the impulse producer coupled to all the devices of the associated denomination, each of which output means receives an electric impulse as an associated device is operated; means coupling each output means to a group of the relays to actuate any prepared relay to operate there being in each group a relay associated with each possible accumulator input means that the produced impulse data could be impressed on in any stage of the calculation; and means to operate selected impulse-producing devices in each of selected denominations of the impulse producer.

4. The combination of claim 3 wherein the electronic relays are gaseous triode electron discharge tubes arranged in operative energy supply circuits having circuit elements of resistance, capacitance, and distributed inductance wherein conduction in a tube is self-extinguished immediately by reason of oscillatory phenomena in the supply circuits.

5. The combination of claim 3 wherein the electronic relays are electron gas discharge tubes each having at least an anode, a cathode, and a control grid, wherein there is a plurality of grid bias sources and wherein the tubes of the same control groups are coupled to the same group grid bias potential source.

6. The combination of claim 3 wherein the electronic relays are gaseous discharge electron tubes each having at least an anode, a cathode, and a control member, wherein common anode-cathode potential supply circuits for the relay tubes coupled to an input conductor include circuit elements of resistance, capacitance, and inductance of such values that conduction in any tube of the group causes the tube to become self-extinguished by an oscillatory rise in its cathode potential, and wherein the cathodes of the relay tubes are coupled to the associated input conductor.

7. The combination of claim 3 wherein the electronic relays are gaseous discharge electron tubes each having at least an anode, a cathode, and a control member, wherein common anode-cathode potential supply circuits for the relay tubes supplied to an input conductor include circuit elements of resistance, capacitance, and inductance of such values that conduction in any tube of the group causes the tube to become self-extinguished by an oscillatory rise in its cathode potential, wherein the cathodes of the relay tubes are coupled to the associated input conductor, wherein there is a plurality of grid bias sources, and wherein the control members of the tubes of a control group have the same individual potential bias source.

8. The combination of claim 3 wherein the electronic relays are gaseous discharge electron tubes each having at least an anode, a cathode, and a control member, wherein common anode-cathode potential supply circuits for the relay tubes coupled to an input conductor include circuit elements of resistance, capacitance, and inductance of such values that conduction in any tube of the group causes the tube to become self-extinguished by an oscillatory rise in its cathode potential, wherein the cathodes of the relay tubes are coupled to the associated input conductor, wherein there is a plurality of grid bias sources, wherein the control members of the tubes of a control group are connected to the same individual normally controlling potential bias source, and wherein each of the control group energizing means is an electron tube having at least an anode and a cathode arranged in a circuit causing it to have a potential rise in its cathode supply circuit when it commences to conduct, which rise energizes the control group of relays.

9. The combination of claim 3 wherein the electronic relays are gaseous discharge electron tubes each having at least an anode, a cathode, and a control member, wherein common anode-cathode potential supply circuits for the relay tubes coupled to an input conductor include circuit elements of resistance, capacitance, and inductance of such values that conduction in any tube of the group causes the tube to become self-extinguished by an oscillatory rise in its cathode potential, wherein the cathodes of the relay tubes are coupled to the associated input conductor, wherein there is a plurality of grid bias sources, wherein the control members of the tubes of a control group are connected to the same individual normally controlling potential bias source, wherein each of the control group energizing means is an electron tube having at least an anode and a cathode arranged in a circuit causing it to have a potential rise in its cathode supply circuit when it commences to conduct, which rise energizes the control group of relays, and wherein the control group energizing tubes are arranged by intertube connections in an operative chain wherein they are rendered conducting one at a time in sequence in response to commonly received impulses, each impulse causing the next tube in the sequence to conduct, which act of conduction extinguishes the last conducting tube.

10. A plurality of gaseous electron tubes each having at least an anode, a cathode, and a control grid; means coupling said tubes into a plurality of groups, each group representing a denomination of a multiplicand; means coupling the same tubes into product groups the tubes of each of said product groups having a common anode-cathode supply circuit having circuit elements of resistance, capacitance, and induction of such value that, if conduction commences in a tube, it will be immediately self-extinguished due to oscillatory phenomena in the common supply circuit; means coupling the same tubes into other groups representing stages of a multiplication calculation, each of said tubes in the stage groups having a commonly supplied normally controlling bias electric potential to prevent conduction in any of the associated tubes which normal bias potential of a stage group may be relieved to a point just short of that necessary to permit such tubes to conduct; an input circuit for each of the multiplicand groups, each of which circuits, when given an electric impulse, will affect the bias control of the associated tubes so that any such tube that has its bias relieved will become conducting and self-extinguish; means to impress a selected number of electric impulses on each of selected input circuits, said input circuits being given their input impulses in sequence; means to repeat said sequential operation of the impressing means a certain selected number of times for each of selected stages of a multiplying calculation; means correlating the relieved stage control bias of the relay groups and the stage operation of the multiplicand groups so that the same stages are acting together; means to accumulate denominationally significant electric impulses, said means including denominational accumulator input circuits; an output terminal for each product group; and means connecting the output terminals of the product groups to the associated denominational input circuits for the accumulator, so that impulses representing product data are entered into the proper denomination of the accumulator according to the stage of a multiplication operation.

11. In combination, a denominational electric impulse producer selectively operable to produce in a cycle of operation a selected number of unit-representing electric impulses in each of selected denominations; a denominational accumulator of data introduced into it in the form of denominational unit-representing electric impulses; relay means for transmitting the produced impulses, said relay means being controllable to route denominational impulses into a denomination of like power, or into next adjacent powers, their being an equal number of said next higher powers of the accumulator available to any one denomination of the impulse producer, said number being the stage capacity for a calculating operation; stage control means actuable to control the routing means to route the produced impulses stage by stage; tally control means having denominations equal in number to the stages, which tally is actuable to produce in each of selected denominations a selected number of electric impulses each of which actuates the impulse producer to operate a cycle; and means interconnecting the stage control means and the tally means so that the corresponding stages of each are active at the same time.

12. In a multiplying device, the combination of means for producing electric impulses of unit value in selected numbers on selected denominational output conductors in sequence in and by denominations in repeating cycles; a denominational accumulator for counting electric impulses; a routing means for the produced impulses providing a plurality of normally inactive transmitting means over which the impulses of a denomination may be transmitted to the accumulator, each route being associated with a particular denomination of the accumulator; a denominational recycling unit for the impulse producer selectively operable sequentially by denominations to cause a recycling of the impulse producer a selected number of times in selected denominations; a stage control unit activating a certain route for each output conductor and activating a certain denomination of the recycling unit to operate together, said stage control unit shifting the routing on completion of operation in a denomination of the recycling unit and causing the next denomination of the recycling unit in its sequence to commence operation; and starting means to initiate actuation of the stage control means which activates the routing means associated with the first selected stage of the recycling unit.

13. In a multiplying device, the combination of means for producing electric impulses of unit value in selected numbers on selected denominational output conductors in sequence in and by denominations in repeating cycles; a denominational accumulator for counting electric impulses; a routing means for the produced impulses providing a plurality of normally inactive transmitting means over which the impulses of a denomination may be transmitted to the accumulator, each route being associated with a particular denomination of the accumulator; a denominational recycling unit for the impulse producer selectively operable sequentially by denominations to cause a recycling of the impulse producer a selected number of times in selected denominations; a stage control unit activating a certain route for each output conductor and activating a certain denomination of the recycling unit to operate together, said stage control unit shifting the routing on completion of operation in a denomination of the recycling unit and causing the next denomination of the recycling unit in its sequence to commence operation; and starting means selectively controlled by the selective operation of the recycling unit to initiate a multiplying operation by activating the routing means associated with the first selected denomination of the recycling unit.

14. In a multiplying device, the combination of means for producing electric impulses of unit value in selected numbers on selected denominational output conductors in sequence in and by denominations in repeating cycles; a denominational accumulator for counting electric impulses; a routing means for the produced impulses providing a plurality of normally inactive transmitting means over which the impulses of a denomination may be transmitted to the accumulator, each route being associated with a particular denomination of the accumulator; a denominational recycling unit for the impulse producer selectively operable sequentially by denominations to cause a recycling of the impulse producer a selected number of times in selected denominations; a stage control unit activating a certain route for each output conductor and activating a certain denomination of the recycling unit to operate together, said stage control unit shifting the routing on completion of operation in a denomination of the recycling unit and causing the next denomination of the recycling unit in its sequence to commence operation; and starting means selectively controlled by the selective operation of the recycling unit to initiate a multiplying operation by activating the routing means associated with the first selected denomination of the recycling unit, and to thereafter commence operation of said first selected denomination of the recycling unit.

15. In combination, a denominational accumulator of numerical data actuable by electric impulses, each impulse representing a unit of data; an input means for each denomination to enter data directly into the denominations of the accumulator; one or more electronic relays coupled to each input means so that conduction in any relay impresses an electric impulse on the associated input means; means coupling the relays into control groups, there being a relay for each of a plurality of adjacent accumulator denominational input means in each group, the plurality of input means associated with a control group constituting those by which data may be entered into the accumulator during a particular stage of a calculating operation, and the several control groups corresponding to various stages of such calculating operation; stage control means for priming the relays of each control group, the control groups being primed selectively according to the stage of the calculation and the priming of a control group preparing the associated relays for operation; a multi-denominational impulse producer having denominational output conductors and means to produce selected numbers of electric impulses on desired ones of the output conductors in succession; and means coupling each output conductor to a relay device in each of the control groups, the relay devices which are coupled to an output conductor being also coupled to adjacent denominational input means, so that, as the control groups are primed in successive stages, impulses on the output conductors can be effective to cause various primed relay devices to operate and impress impulses on the input means to cause entries to be made in proper denominations of the accumulator.

16. In combination, an electron tube means to produce a selected number of unit-representing electric impulses on each of selected numerical denominational output conductors; electron tube means to initiate a recycling of the impulse producer to produce the same pattern of impulses; a denominational accumulator comprising electron tubes for counting electric impulses entered into it according to denominations; an electron tube routing means operable to connect any particular denominational output conductor of the impulse producer with any of several adjacent denominations of the accumulator, each of said possible connections representing a stage of a multiplying operation; an electron tube multi-denominational tally unit settable according to a multi-digit factor of a multiplication and operating by denominations in sequence for controlling the number of cycles in each stage of a multiplying operation according to the digits of said factor, said tally unit in a denominational operation actuating the impulse producer recycling means a number of times corresponding to the digit of that stage of the multiplying operation; and an electron tube stage control means controlled by said tally unit according to the denominations of digits in said factor, said stage control means controlling the tally unit to render the denominations of the tally unit successively effective to actuate the impulse producer recycling means as multiplication progresses and connected to said routing means to correspondingly control the routing means to route the impulses on the denominational output conductor to proper denominations of the accumulator according to the then operating denomination of the tally unit.

17. In a multiplying device, the combination of means for receiving one factor of a multiplication; electron tube means controlled thereby for producing electric impulses of unit value in selected numbers on selected denominational output conductors according to said factor, in sequence in and by denominations; a denominational accumulator including denominational electron tube means for counting electric impulses; and electron tube routing means for the produced impulses providing a plurality of normally inactive transmitting means over which the impulses of a denomination may be transmitted to the accumulator, each transmitting means being associated with a particular denomination of the accumulator; means for receiving the other factor of a multiplication; an electronic multi-denominational recycling unit for the impulse producer selectively operable sequentially by denominations under control of the means for receiving the other factor to initiate a recycling of the impulse producer a selected number of times according to digits in the denominations of said other factor; and an electron tube stage control unit controlled by said other factor receiving means according to the denomination of said other factor and by said recycling unit to activate a certain route for each output conductor and activate a certain denomination of the recycling unit to operate together, said stage control unit controlling the routing means to shift the routing on completion of operation in a denomination of the recycling unit and causing the next denomination of the recycling unit in its sequence to initiate the operation of the impulse producer.

18. In a multiplying device, the combination of a multiplicand impulse generator unit comprising electron tubes for producing denominationally valued unit impulses in selected numbers, denomination by denomination, in denominational sequence in a cycle; an electron tube multi-denominational multiplier tally unit settable according to a multi-digit multiplier and operating by denominations in sequence for initiating the recycling of the multiplicand impulse generator unit a number of times corresponding to the digits of the denominations of the multiplier in a multiplying operation; a multi-denominational accumulator, each denomination of which is made up of digit-representing electron tubes and circuits interconnecting them for accumulating operation in response to electric impulses; and electron tube means rendered selectively effective under control of the tally unit to distribute the generated impulses of a cycle of the multiplicand impulse generator unit to predetermined ones of the accumulator denominations according to the denomination of the tally unit in control of initiation of the particular cycle.

19. In a multiplying device operable in stages of operation, one for each digit of one factor, the combination of multi-denominational electronic means for producing selected numbers of unit-representing electric impulses representative of the other factor in each of selected denominations in sequence in a cycle; electronic recycling means for initiating the operation of the impulse-producing means a selected number of cycles in each stage of a calculation; an electronic accumulator of denominational unit-representing electric impulses, having denominational input conductors, each for receiving unit impulses of predetermined denominational value and having corresponding denominational banks of tubes interconnected to accumulate said impulses; stage control means controlled by the recycling means; and distributing means including electron tube relays rendered selectively effective by the stage control means in various stages to relay impulses from the impulse-producing means to the input conductors of the accumulator, said relays being selectively effective to distribute the impulses produced in the denominations of the impulse-producing means to the proper ones of a related plurality of denominations of the accumulator according to the stage of the calculation in which the impulses are produced.

ROBERT E. MUMMA.

REFERENCES CITED

The following references are of record in the file of this patent:

UNITED STATES PATENTS

| Number | Name | Date |
| --- | --- | --- |
| 1,927,702 | Foss | Sept. 19, 1933 |
| 2,079,429 | Tauschek | May 4, 1937 |
| 2,242,897 | Staggs | May 20, 1941 |
| 2,259,329 | Slepian | Oct. 14, 1941 |
| 2,268,859 | Dohle | Jan. 6, 1942 |
| 2,294,457 | Holden | Sept. 1, 1942 |
| 2,300,505 | Hubbard | Nov. 3, 1942 |
| 2,310,105 | Michel | Feb. 2, 1943 |
| 2,311,455 | Meuhter | Feb. 16, 1943 |
| 2,346,616 | Saxby | Apr. 11, 1944 |
| 2,354,768 | Nokes | Aug. 1, 1944 |